United States Patent [19]
Bähr

[11] Patent Number: 5,961,827
[45] Date of Patent: Oct. 5, 1999

[54] APPARATUS FOR DEWATERING OF SLUDGE AND SIMILAR SUBSTANCES

[76] Inventor: Albert Bähr, 10, Am Hungerberg, D-66564 Ottweiler, Germany

[21] Appl. No.: 08/906,980

[22] Filed: Aug. 6, 1997

[30] Foreign Application Priority Data

Aug. 28, 1996 [DE] Germany .................. 296 14 898 U
Jul. 1, 1997 [DE] Germany ..................... 197 27 762

[51] Int. Cl.⁶ .................. B01D 25/127; B01D 25/172; B01D 25/32
[52] U.S. Cl. .................. 210/387; 210/391; 210/400; 100/118; 100/152; 100/193
[58] Field of Search .................. 210/386, 401, 210/225, 297, 350, 400, 783, 770, 387, 391; 100/118, 152, 194, 193

[56] References Cited

FOREIGN PATENT DOCUMENTS

| 407884 | 1/1991 | European Pat. Off. . |
| 714687 | 6/1996 | European Pat. Off. . |
| 4223022 | 1/1994 | Germany . |

*Primary Examiner*—Robert J. Popovics
*Attorney, Agent, or Firm*—Evenson, McKeown, Edwards & Lenahan, P.L.L.C.

[57] ABSTRACT

The invention relates an apparatus for the dewatering of sludge and similar substances with a sludge chamber (20) provided with filter areas (25) having at least one sludge inlet being connected to a device (3) creating a hydrostatic filtration pressure. The sludge chamber is formed by pressure plates (22, 23) which can be pressed against each other to create an additional mechanical dewatering pressure by high pressure generators (33). Further there is provided a predewatering stage (2) containing filter areas which is forming a compensation container (5) and which is connected to a continuous sludge feed (6). The device (3) for creating the hydrostatic filtration pressure is formed as one or more syringe-like piston cylinder units (14) of preferably as one or more containers being changeable in volume. These have a sludge inlet connected to the predewatering device (2) and a sludge outlet (17) connected with the sludge chamber (20), wherein at the sludge inlet and at the sludge outlet there are provided closing and control valves (21) which are alternately operable.

13 Claims, 29 Drawing Sheets ately operable closing and control valves, in that the upper pressure plate is stationary and, in that the predewatering means is positioned above the upper pressure plate.

APPARATUS FOR DEWATERING OF SLUDGE AND SIMILAR SUBSTANCES

FIELD OF THE INVENTION

The invention relates to an apparatus for dewatering sludge and similar substances having a sludge chamber provided with filter areas and having at least one sludge inlet being connected to a means for creating a hydrostatic filtration pressure, wherein said sludge chamber is formed by pressure plates of which at least one is relatively movable by high pressure generators to decrease the volume of said sludge chamber after achieving the hydrostatic dewatering pressure, wherein further a predewatering stage containing filter areas is provided which is performed as a compensation container and which is connected to a continuous sludge feed and further is connected with said means for creating the hydrostatic filtration pressure and, wherein further the filter areas of the sludge chamber are movable relatively to the sludge chamber after opening said pressure plates to remove the filter cake.

BACKGROUND OF THE INVENTION

An apparatus of this kind according to an earlier proposal of the applicant is for example known from the DE-OS 42 23 022. In spite of the fact that in view of the efficiency said construction known from the earlier proposal is forming a so to say continuously working chamber filter press, the necessary constructive expenditure is comparatively high. Further, the hydrostatic dewatering pressure in this known construction is created by the usual pressure pumps which is having certain disadvantages with respect to the delicate handling of the sludge containing a flocculating agent.

SUMMARY OF THE INVENTION

Starting out from this prior art, therefore, the present invention has the aim to improve this known construction in that with the lowest possible constructive expenditure and with a large through-put optimal dewatering is obtainable while simultaneously the flocculated sludge is treated as gently as possible.

According to the invention, this task in accordance with a first alternative basically is solved by the fact that the means for creating the hydrostatic filtration pressure is performed as one or more syringe-like piston cylinder units having a sludge inlet connected to the predewatering means and a sludge outlet connected with the sludge chamber, in that at the sludge inlet and at the sludge outlet there are provided alternately operable closing and control valves, in that the upper pressure plate is stationary and, in that the predewatering means is positioned above the upper pressure plate.

By the invention, especially the advantage is obtained that the hydrostatic dewatering pressure is created extremely gentle since the flocculated sludge is pressurized by the syringe-like piston cylinder units, i.e. mechanically is treated in a way which ensures that the flocculation cannot be destroyed. Further, constructively the apparatus according to the invention is extremely compact and cost-saving due to the fact that merely one of the pressure plates is movable to create the additional mechanical dewatering pressure and due to the fact that the predewatering stage is positioned above the upper stationary pressure plate. By the latter feature, additionally, an extremely short and gentle way of the predewatered sludge to the syringe-like piston cylinder units is obtained.

According to an alternative solution of the task being basis for the invention, there in an apparatus of the above kind it is provided that the means for creating the hydrostatic dewatering pressure is performed as one or more containers being changeable in their volume and, in that the containers have an axial flow path, wherein the axis of the containers is congruent with the axes of the sludge outlet line of the predewatering stage and the sludge inlet line of the sludge chamber. Compared with the above-mentioned first solution of the task being basis for the invention, here the additional advantage is achieved that the sludge without changing its direction of flow in a straight line is reaching the sludge chamber from the predewatering stage which means that an extremely gentle treatment of the flocculated sludge is assured.

In detail, in this connection it is possible to perform said containers as laterally compressible bellows in the kind of bellows pumps.

According to an especially preferred embodiment in this alternative embodiment of the invention said containers are performed as concertina bellows which are changeable in their length in an axial direction because by this the constructive expenditure is minimum and further a still more gentle treatment of the flocculated sludge is achieved.

According to an especially preferred embodiment of the invention, said sludge chamber is having a plurality of sludge inlets and there is provided a corresponding number of piston cylinder units or containers, respectively, wherein each of their sludge outlets by a separate connection line is connected with one of the inlets of the sludge chamber. By this a fast and extremely gentle filling of the sludge chamber is possible since the predewatered sludge here has much shorter ways within the sludge chamber.

The closing and control valves can be performed as flat slides, wherein, however, to achieve a more simple construction in an especially preferred embodiment according to the invention, it is provided that the closing and control valves are performed as turn-tables simultaneously opening or closing said plurality of sludge inlets and/or said plurality of sludge outlets, in that the turn-table assigned to said plurality of sludge outlets is positioned directly at the sludge inlets of the sludge chamber and, in that the turntable by springs is pretensioned against a seal. By doing so, by a single constructive member, namely, by said turn-table a simultaneous operation of the control and closing valves is obtained, wherein it is assured that the sludge chamber sufficiently is sealed at the beginning of the creating of the hydrostatic dewatering pressure while with the pressure increasing the sealing action is increasing, too, by the fact that by the interior pressure of the sludge chamber and with the pressure increasing is pressed against the seal.

A further improvement of the invention is possible by the fact that the filter areas of the predewatering stage are amounting to about 90% and the filter areas of the sludge chamber to about 10% of the entire filter area of the apparatus, in that the sludge chamber is having a circular contour and, in that the filter areas of the sludge chamber are formed by a filter belt being rectilinear reciprocable on the movable lower pressure plate. By this, an optimal pressure distribution and further an extremely simple construction of the seal is possible. Simultaneously it is achieved that the filter cake simply laterally can be removed from the opened sludge chamber, whereafter then in a simple way that cleaning of the filter cloth during its return movement can follow while the filter cloth again is returning into the sludge chamber.

Further, it is preferred that the sludge chamber is surrounded by an annular flexible seal being fixed on the upper stationary pressure plate and, in that the seal is pretensioned in the direction of the movable pressure plate and, in that said seal by means of push-rods being supported in the stationary pressure plate is pretensioned in the direction of the movable pressure plate. By this, the constructive expenditure for sealing the sludge chamber in its closed position is as low as possible. Further, it is achieved that a safe sealing of the sludge chamber, especially during the creation of the hydrostatic dewatering pressure is assured, too.

To minimize the constructive expenditure, it is further preferred to fix the predewatering stage and the piston cylinder units on the upper stationary pressure plate because this pressure plate due to the fact that it is stationary is forming an excellent support for these constructive members making a compact construction possible.

Further it is preferred that within the sludge chamber, the filter area is supported on a bearing plate which is provided with channels being opened to the filter area and, in that said channels are performed as bores. By this, a fast and secure removal of the filtrate produced during the dewatering on the outside of the filter area is assured.

In detail, it is further preferred that the bearing plate is having a flat circular recess in the area opposite the seal and, in that in the recess preferably relieve bores are provided facilitating the compression of the flexible seal. This recess by milling is created in the surface of the bearing plate which apart from that is being untreated and is forming an optimal contact area for the seal. By this, an extremely safe sealing of the sludge chamber is obtained.

In detail, the invention can be improved further by the fact that the high pressure generators laterally are positioned exterior of the area of the sludge chamber and, in that the high pressure generators are performed as hydraulic single action cylinders.

This embodiment has the advantage that extremely high pressures can be created with comparatively cheap high pressure generators, wherein simultaneously a mechanically safe and simple construction can be created.

In an especially preferred improvement of the invention, the closed position of the sludge chamber is mechanically lockable, wherein preferably for said locking a detent apparatus is provided acting on the lower movable pressure plate. By this, the advantage is achieved that during the dewatering with the hydrostatic pressure the sludge chamber safely and with the simple means is kept closed which means that this task has not to be performed by the high pressure generators. The reaction forces during this action safely and mechanically simple are taken by the detent apparatus.

Further, it is especially preferred that the predewatering device is having a circular cross-section, that the predewatering device is containing two concentric filter baskets the gap between them being connected to the continuous sludge feed, that the sludge outlets are positioned in the bottom of the gap between the filter baskets and that the sludge inlets of the piston cylinder units are positioned directly below the sludge outlets. By this, an extremely compact construction with a maximum filter area is obtained, wherein simultaneously extremely gentle and short ways for the flocculated and predewatered sludge are ensured.

In this connection, it is especially preferred that on the filtrate side of each filter basket rotatably driven brushes are provided which are extending over the height of the filter baskets. By this, the dewatering performance of the predewatering stage is extremely increased.

In the embodiment according to the invention in which the means for creating the hydrostatic filtration pressure is consisting of concertina bellows, it is especially preferred that the concertina bellows are suspended from the predewatering stage and that for creating the hydrostatic filtration pressure, the upper and lower pressure plate in unison are liftable with the sludge chamber being closed in such a way that during this lifting movement the concertina bellows are compressed. By this, with a low constructive expenditure it is assured that the hydrostatic pressure uniformly is created in the sludge chamber, wherein simultaneously singular drives for the concertina bellows are avoided.

BRIEF DESCRIPTION OF THE DRAWINGS

In the following, the invention more detailedly is described with reference to the drawings showing exemplary embodiments of the invention. In the drawing show.

DETAILED DESCRIPTION OF THE DRAWINGS AND OF THE PREFERRED EMBODIMENT

Figure 1:
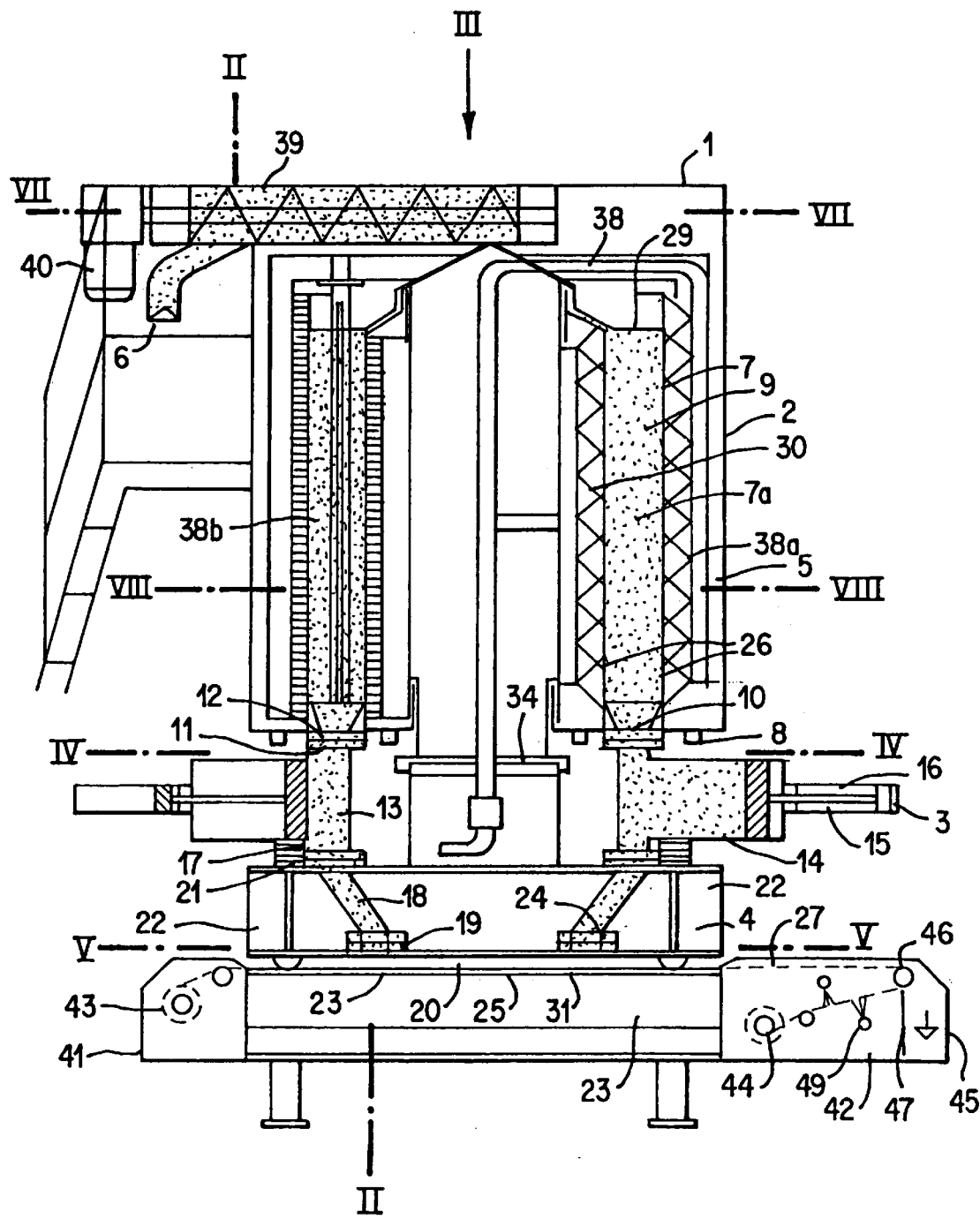
FIG. 1 a schematic side view of the apparatus according to the invention in cross-section.
Figure 2:
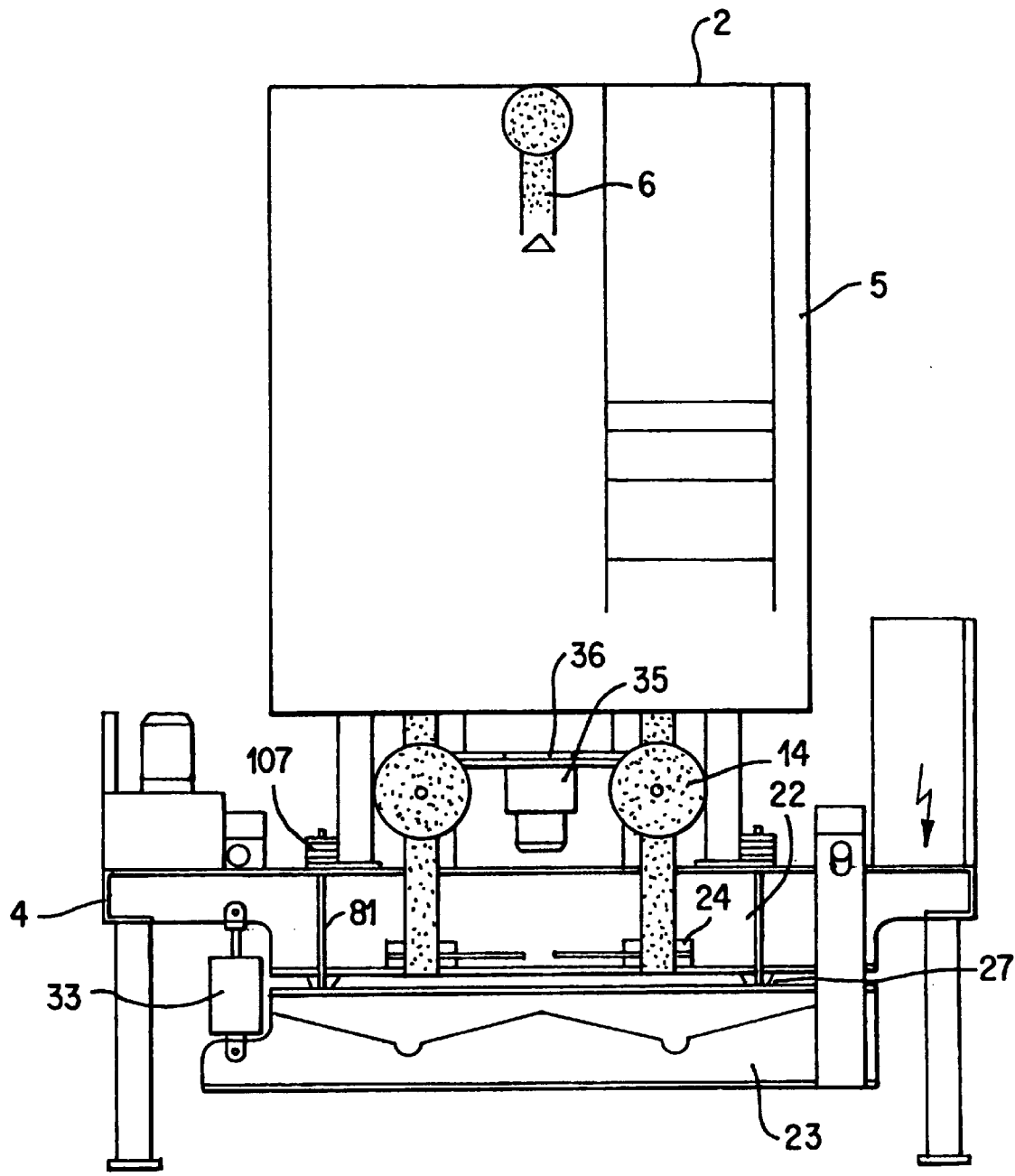
FIG. 2 a cross-sectional view along the line II—II according to FIG. 1.
Figure 3:
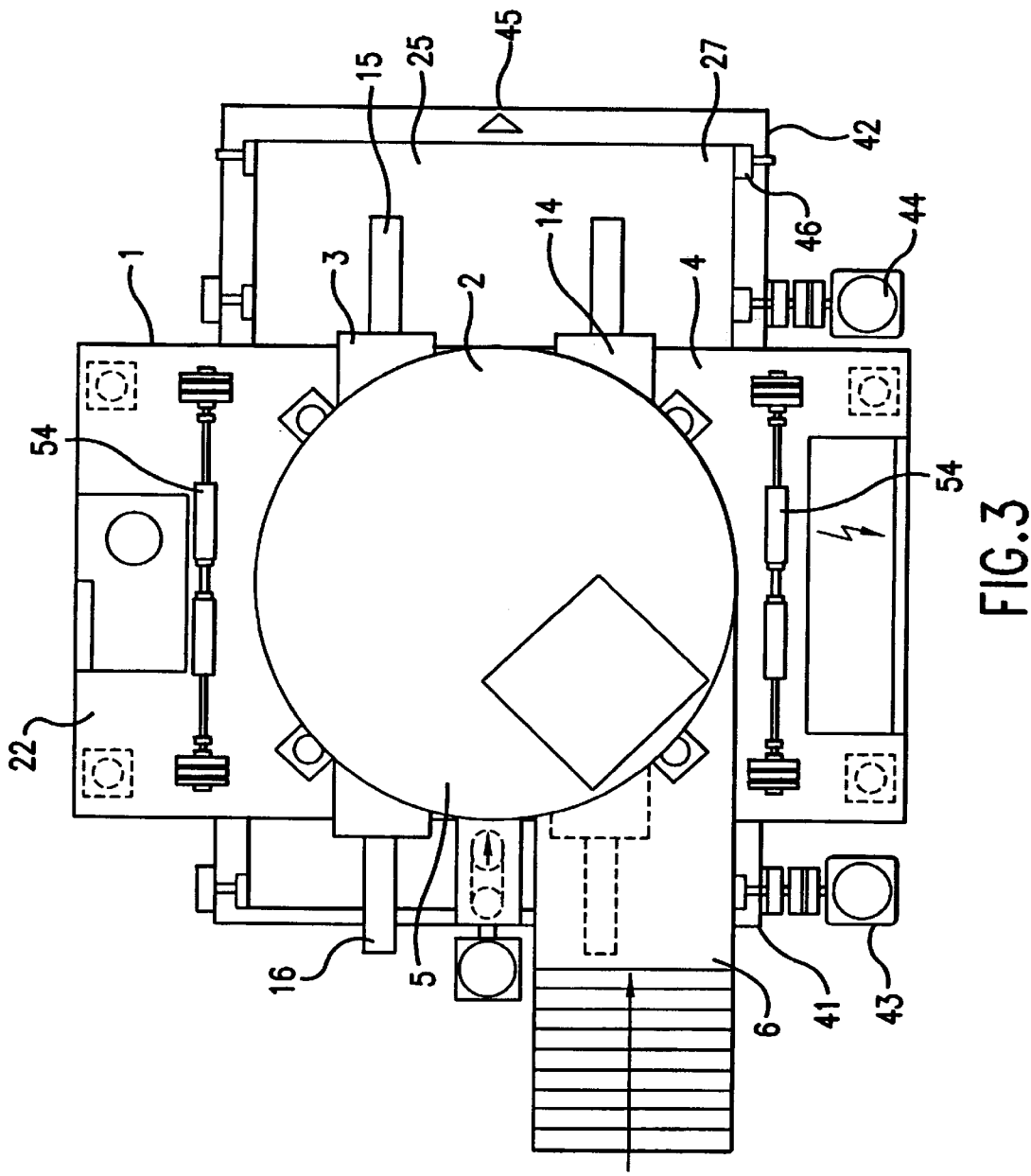
FIG. 3 a top view of the apparatus according to FIG. 1 in the direction of arrow III in FIG. 1.

The exemplary embodiment of the apparatus according to the invention generally designated with 1 shown in FIGS. 1 to 8 is consisting of three main parts, namely, a predewatering device 2, a means 3 for creating a hydrostatic dewatering pressure and the filter press 4.

The predewatering stage 2 is forming a compensation container 5 which is connected to a continuous sludge feed 6. In the compensation container 5 which is formed by the predewatering stage 2, there are positioned filter baskets 7, 7a, wherein the predewatering stage at the bottom end is having a number of filtrate outlets 8. The filter baskets 7, 7a in the gap 100 between them are receiving the sludge 9 which is continuously fed into the compensation container 5.

At the bottom end of the gap 100 between the two concentric filter baskets 7, 7a, the predewatering stage 2 is having a number of sludge outlet lines 10 which are formed by short funnel-shaped muffs and which are connected with the sludge inlets 11 of the means 3 for creating the hydrostatic pressure. Between each sludge outlet line 10 and the assigned sludge inlet 11 there is provided a closing and control valve performed as a flat-slide 12 by which the feed of the sludge into the means 3 can be interrupted.

As shown, the means 3 for creating the hydrostatic filtration pressure is performed as a number of syringe-like piston cylinder units 14, the cylinder head 13 of which is containing the sludge inlet 11 and a preferably coaxially positioned sludge outlet 17. The piston of the piston cylinder units 14 with its piston rod is connected to a drive 15 which in the shown embodiment is formed by a hydraulic piston or a pneumatic piston 16.

The sludge outlet 17 of the piston cylinder units 14 by a short line 18 is connected to an appropriate sludge inlet 19 of a sludge chamber 20 of the filter press 4, wherein between the sludge outlet 17 and the line 18 there is provided a further closing and control valve performed as a flat slide 21. As especially shown in FIG. 1, a further control and closing valve performed as a flat slide preferably directly can be positioned at each sludge inlet 19 of the sludge chamber 20, wherein the flat slide 24 synchronously is operated with the flat slide 21 as this more detailedly is described further below.

The sludge chamber 20 of the filter press 4 is formed between an upper pressure plate 22 and a lower pressure plate 23, wherein in the shown embodiment the lower pressure plate 23 in a vertical direction is movably supported.

The sludge chamber 20 is formed by the upper pressure plate 22 and a filter area 25 on the lower pressure plate 23, wherein the sludge chamber circumferentially is closed by a seal fixed to the upper pressure plate 22 which more detailedly is described below and which with the sludge chamber 20 closed sealingly is contacting the filter area 25. Preferably the filter area 25 is formed by a filter belt 27, wherein the filter belt 27 is supported by a bearing plate 31 which is fixed to the lower pressure plate 23. The pressure plate 31 on the side facing the filter belt 27 is having channels or bores which are for the removal of the filtrate emanating through the filter belt 27. This is more detailedly described further below.

The apparatus 1 described generally above is working such that the sludge to be dewatered by the continuous sludge feed continuously is fed into the compensation container 5 formed by the predewatering stage, wherein in accordance with the operational stage a upper sludge level 29 or a lower sludge level 30 can be existing. The sludge continuously fed is in the compensation container 5 continuously predewatered under gravity, wherein the occurring filtrate is removed through the filtrate outlets 8. The sludge retained in the gap 100 between the filter baskets 7 and 7a in the outlet lines 10 followingly already is having a dry matter contents of about 20%. The dry matter content after the continuous predewatering in general is dependent from the original dry matter contents of the sludge and from the kind of sludge. With organic sludges about 25% and with an organic sludges about 50% are achieved.

Through the sludge outlet lines 10 in portions an amount of sludge is transferred into the piston cylinder units 14 by opening the flat slides 12 and the piston of the piston cylinder units 14 is moved from its front position by the drive 15 backwardly. This filling movement can be done extremely gentle and slowly to maintain the flocculation of the sludge. The plurality of piston cylinder units 14 during this action are receiving an amount of sludge corresponding about the one and a half time the volume of the sludge chamber 20. It is of especial importance that the volume of the units 14 or of the corresponding means of the embodiments more detailedly described further below is such that merely one stroke is filling the sludge chamber in an optimal way. After the complete filling of the piston cylinder units 14, the flat slide 12 is closed and thereafter the flat slides 21, 24 are opened. Thereafter the pistons of the piston cylinder units 14 by the drive 15 are moved in their forward position which means that in the sludge chamber 20 a hydrostatic pressure is created because of the fact that the volume of the piston cylinder units 14 is larger than the volume of the sludge chamber 20. Thereafter preferably the flat slides 21, 24 are closed again and the flat slide 12 is opened again, whereafter the piston 14 again is moved to its backward position by the drive 15 which means that the piston cylinder units 14 again are filled with sludge. Thereafter the flat side 12 again is closed and the flat slides 21, 24 are opened and the piston of the piston cylinder units again is moved forwardly creating a hydrostatic pressure in the sludge chamber 20 which can be about 5 bar. After achieving the hydrostatic pressure in the sludge chamber, the flat slides 21 and 24 again are closed and the piston cylinder units by opening the flat slides 12 again are completely filled and are ready for the next cycle. Thereafter the volume of the sludge chamber 20 by activating high pressure generators 33 is decreased by moving the lower pressure plate 23 upwardly against the upper pressure plate 22 thereby creating a mechanical dewatering pressure which for example can be in the order of about 30 bar and which followingly is extremely larger than the hydrostatic pressure achieved before.

After performing the additional dewatering by the mechanical dewatering pressure then the high pressure generators 33 are relieved, the sludge chamber 20 is opened and the filter cake obtained is removed from the sludge chamber 20 by horizontally moving the filter belt 27. The filter belt 27 thereafter horizontally is returned and is washed during this movement. Thereafter the sludge chamber is closed again and the cycle described above can be performed again. During the entire time, the predewatering stage 2 continuously is fed with fresh sludge which means that the sludge 9 contained in the gap 10 is changing between the upper sludge level 29 and the lower sludge level 30.

In the following, it is more detailedly referred to the constructive details of the apparatus 1 according to the invention.

As shown in FIGS. 1 to 8, the upper pressure plate 22 is stationary and not movable and simultaneously is forming the support for the predewatering stage 2 and the piston cylinder units 14 positioned on the upper pressure plate 22. The sludge chamber 20 in the shown embodiment is having four sludge inlets 19 to which correspondingly four piston cylinder units 14 are connected by each piston cylinder units 14 having a corresponding separate connection line 18 leading to the corresponding sludge inlet 19 of the sludge chamber 20.

As already mentioned above and as shown in FIGS. 1 to 8 of the drawings, in the predewatering stage forming the compensation container 5, which is having a circular cross section, there are provided two concentric filter baskets 7, 7a. Instead of two concentric filter baskets to save costs merely one filter basket can be provided by substituting the radial inner filter basket 7a by a solid wall. On the respective exterior side of the filter baskets 7, 7a there is provided a cleaning means 38 consisting of washing nozzles 38a and each at least one—in the shown embodiment four brushes 38b extending over the height of the filter baskets 7, 7a. In the gap 100 between the filter baskets 7 and 7a there is provided a stripper 65 being pivotable on a vertical axis into its operational position. The stripper is movable up and down on a rod 35a over the height of the filter baskets 7 and 7a. The unit consisting of the cleaning means 38 and the stripper 35 is rotationally driven by a drive 34 which means that by rotating this unit and by the upward and downward movement of the stripper 35 pivoted into its operational position, in which it is contacting one of the two sides facing the gap 100, both the sludge side and the filtrate side of the filter baskets 7 and 7a can be cleaned thoroughly. In the embodiment shown, the drive 34 is formed by an electric motor 35 and a spur-gear 36.

The brushes 38b are rotationally driven, too, and are rotating on the corresponding filtrate side of the filter baskets 7, 7a. This rotational movement not only ensures a cleaning of the filter baskets 7 and 7a but simultaneously is increasing the dewatering performance of the predewatering stage 2 substantially because of the fact that solid matter sticking to the sludge side of the filter baskets repeatedly are removed and can sink to the bottom. By this simultaneously the filtration resistance increasing by this solid matter upon each rotational movement of the brush 38b is substantially decreased.

As best can be learnt from FIG. 1, in the embodiment shown the continuous sludge feed 6 is formed by a mixer 39 which is fed by a continuously running pump and which is driven by a motor 40 and is continuously feeding the sludge into the compensation container. In the mixer 39 simultaneously by a dosing device not shown flocculation agent is added which means that the sludge is flocculated within the mixer 39 and the compensation container 5, respectively.

In the bottom of the gap 100 in the embodiment shown there are provided four sludge outlets 100 in the form of funnel-shaped muffs which are connected with the four sludge inlets 11 of four piston cylinder units with each one flat slide 5 being positioned in between. The number of the sludge outlets 10 and of the piston cylinder units 14 is corresponding to the number of the sludge inlets 19 of the sludge chamber 20 as this best can be learnt from FIG. 5.

Figure 5:
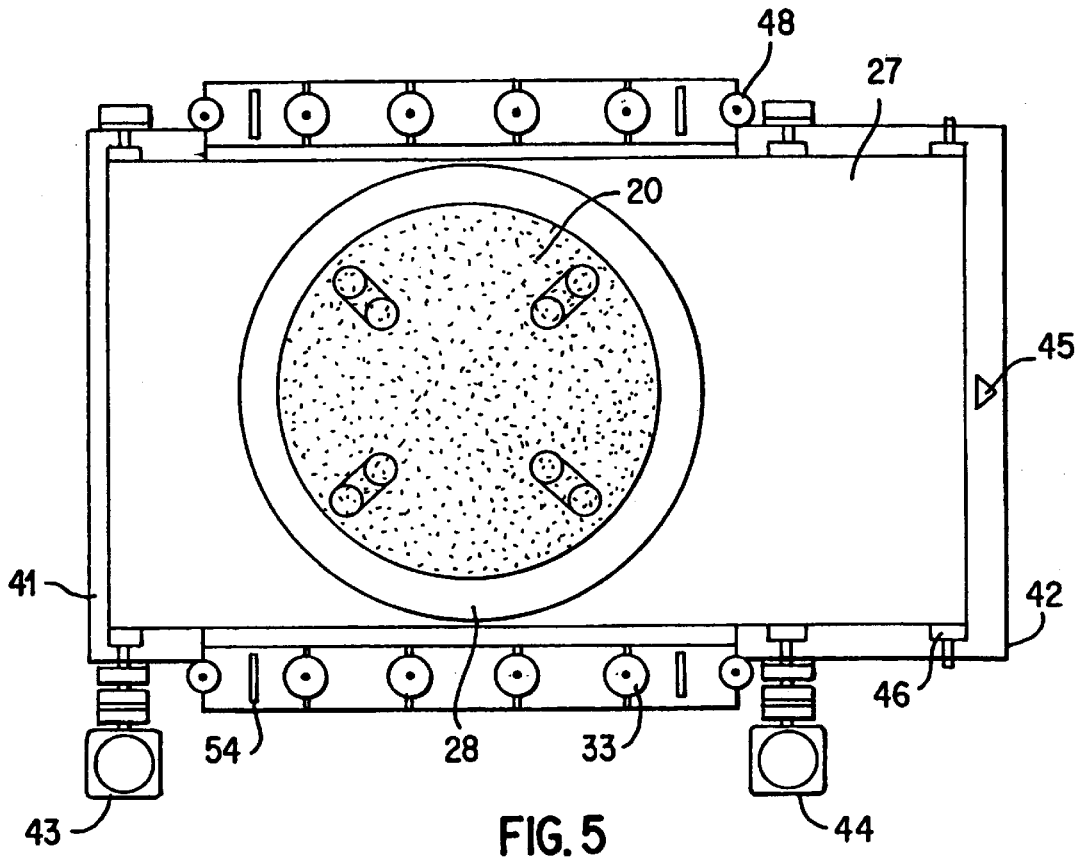
FIG. 5 a cross-section along the line V—V in FIG. 1.

As shown in FIG. 5, the sludge chamber 20 preferably having a circular shape is having a total of four sludge inlets 19 which via four lines 18 with the flat slides 21 and 24 mentioned above singularly are connected with the piston cylinder units 14.

As already mentioned above, the actual filter press 4 is consisting of the upper pressure plate 2 and the lower pressure plate 23, wherein the lower pressure plate 23 by means of the high pressure generators can be lifted and lowered against the upper stationary pressure plate 22. The lower pressure plate 23 is having a bearing plate 31 on the side facing the sludge chamber 22, said bearing plate 31 being provided with channels 75 which are open in the direction of the sludge chamber 20 to remove the filtrate. The bearing plate 31 preferably is consisting of a low friction plastics material because the filter belt forming the filter area 25 of the sludge chamber 20 is sliding on the bearing plate 31.

In the embodiment shown, the filter belt 27 is reciprocably movable in a horizontal direction. The filter belt 27 on its both ends is received by each a reversable winder drive 43 and 44, respectively, which are positioned in lateral extensions 41 and 42, respectively, of the lower movable pressure plate 23. Followingly, the filter belt 27 one time can be wound on the left winder drive 43, i.e. the filter area 25 of the sludge chamber 20 is moved into the sludge chamber, wherein in the contrary case the filter belt 27 is wound onto the right winder drive 44 and the filter area 25 is moved out of the sludge chamber 20. At the winder drive 44 being positioned at the exit end 45 of the filter press 4, the filter belt 27 is guided around a deflection roller 46 having a stripper 47 to remove parts of the filter cake possibly adhering on the filter belt 27 when the filter cake is removed from the press. Further, in the right hand lateral extension 42 of the movable pressure plate 23, there are provided washing nozzles 49 which during the return movement of the filter belt 27 into the opened sludge chamber after the removal of the filter cake can be actuated to wash the filter belt 27.

Figure 4:
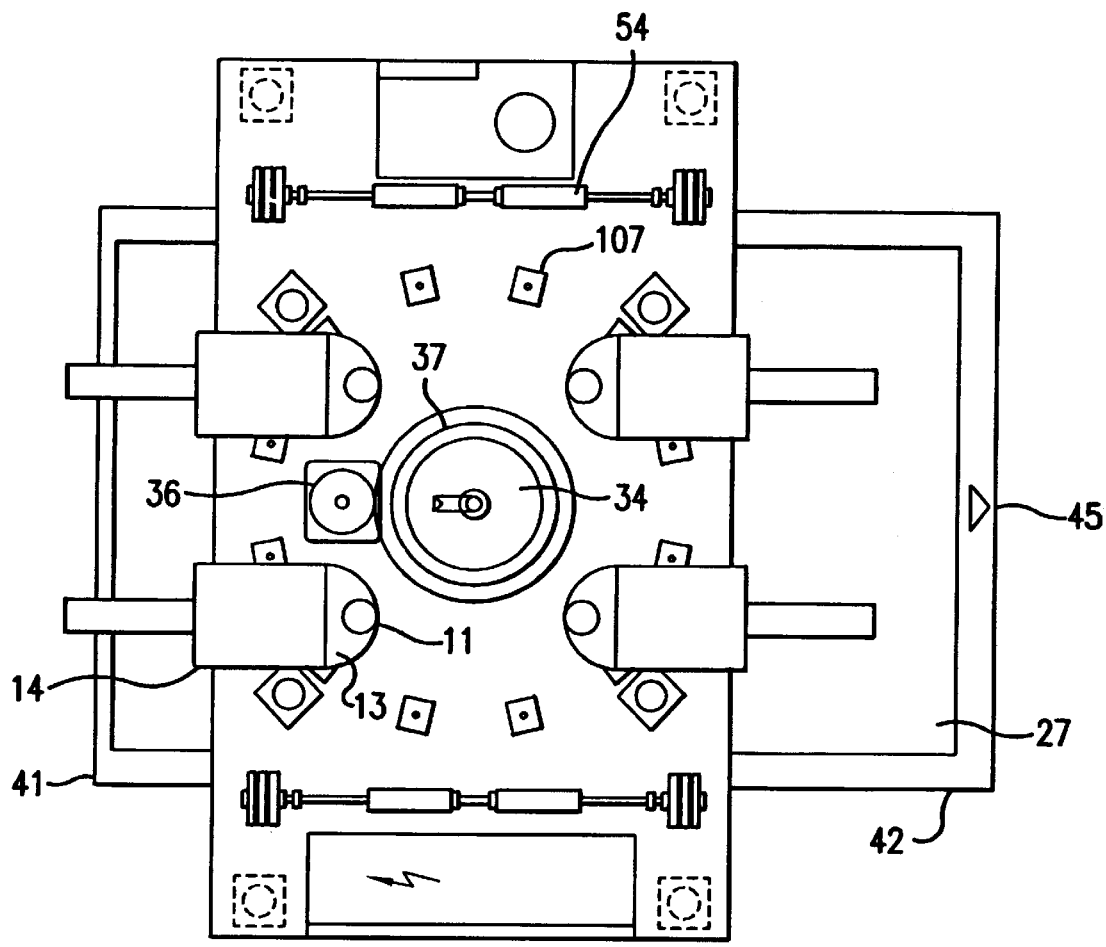
FIG. 4 a cross-section along the line IV—IV in FIG. 1.
Figure 6:
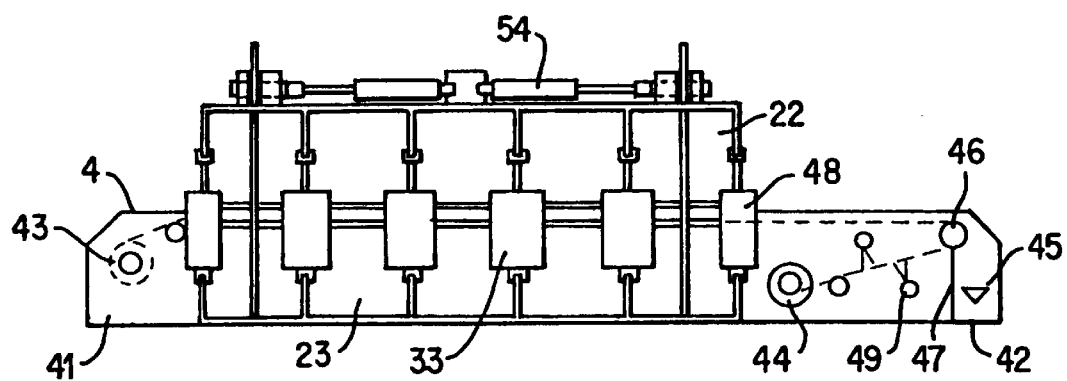
FIG. 6 a schematic side view of the part of the apparatus shown in FIG. 1 containing the sludge chamber.
Figure 7:
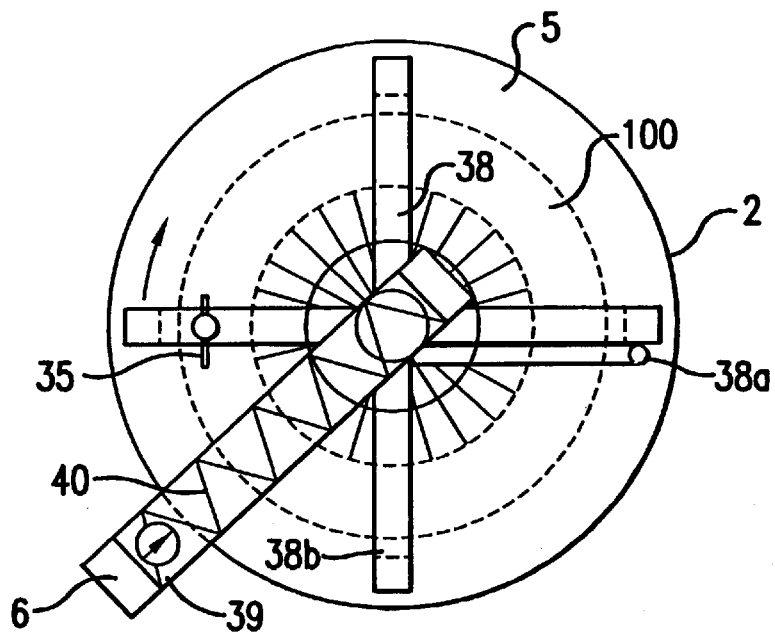
FIG. 7 a cross-section along the line VII—VII in FIG. 1.
Figure 8:
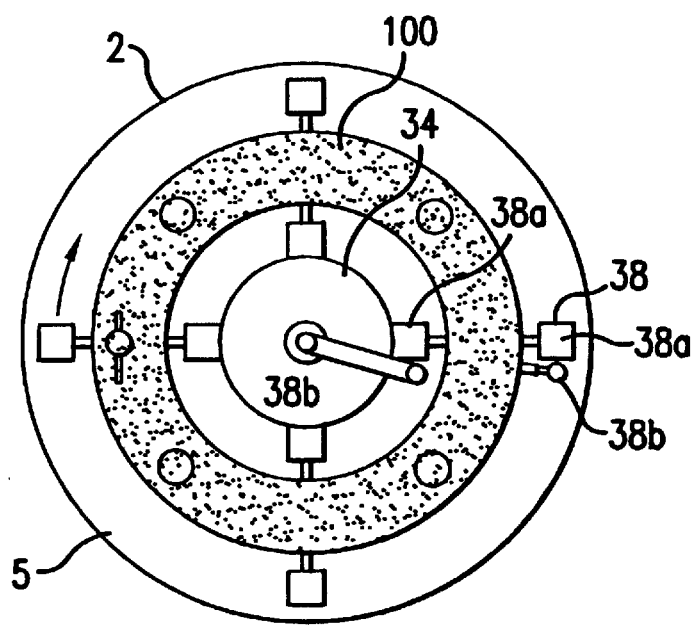
FIG. 8 a cross-section along the line VIII—VIII in FIG. 1.

As further can be seen from FIGS. 4 and 6, it is possible to lock the sludge chamber 20 in the closed position by means of a detent apparatus 54.

By the detent apparatus 54, simultaneously the lower pressure plate 23 being lifted by the lifting cylinders 48 in the beginning is limited in its upward movement by which the position of the closed sludge chamber 20 is defined.

In the embodiment of the invention shown in the drawings, the sludge chamber 20 is formed between the pressure plates 22 and 23 by an annular flexible seal surrounding the sludge chamber 20 and by the area of the filter belt 27 enclosed by this seal. Further details of the seal 28 are more detailedly described with reference to FIGS. 9 to 14.

As further especially can be seen from FIG. 4, the cylinder heads 13 of the piston cylinder units 14 preferably are having a truncated or semi-spheric shape to further be easy on the flocculated sludge during the feeding into the sludge chamber 20.

In the embodiment shown, the dimensions are such that about 10% of the overall filter area are in the sludge chamber 20, whereas 90% of the overall filter area are in the predewatering stage 2, i.e. in the filter baskets 7 and 7a. Preferably two piston cylinder units 14 are used per squaremeter of the filter area 25 in the sludge chamber 20.

In the following, with reference to FIGS. 9 to 11, a first embodiment of the seal 28 is more detailedly described. The FIGS. 9 to 11 in this connection show three different operational states of the filter press 4, i.e. FIG. 9 the completely opened state for removing the filter cake, FIG. 10 the closed state during the creation of the hydrostatic dewatering pressure and, FIG. 11 the state during the additional mechanical dewatering pressure.

As shown, the seal 28 directly is fixed to the upper stationary pressure plate 22, wherein the seal 28 is consisting of a unitary body of an elastic material annularly surrounding the circumference of the sludge chamber 20, wherein suitable materials are rubber or similar synthetic materials.

The elastic body 80 is projecting in the shape of a "W" downwardly from the upper pressure plate 22 and is having two sealing lips 101, 102, contacting the filter belt 27. Between the sealing lips, there is provided an annular recess 103 facing the filter belt 27. On the side forming the interior of the body 80, the seal by an annular body 104 is pretensioned downwardly by means of rods 105 and springs 106 in the direction of the filter belt 27, wherein the springs 106 are positioned in housings 107 on the top side of the upper pressure plate 22. The tension of the springs 106 by thread means 108 is adjustable. When the sludge chamber by moving the lower pressure plate 23 is closed as this is shown in FIG. 10, the seal 28 with a sufficient pressure is pressed against the filter belt 27 by the springs 106. The force necessary is transferred by push rods generally designated with 81 which are formed by the rods 105.

Figure 9:
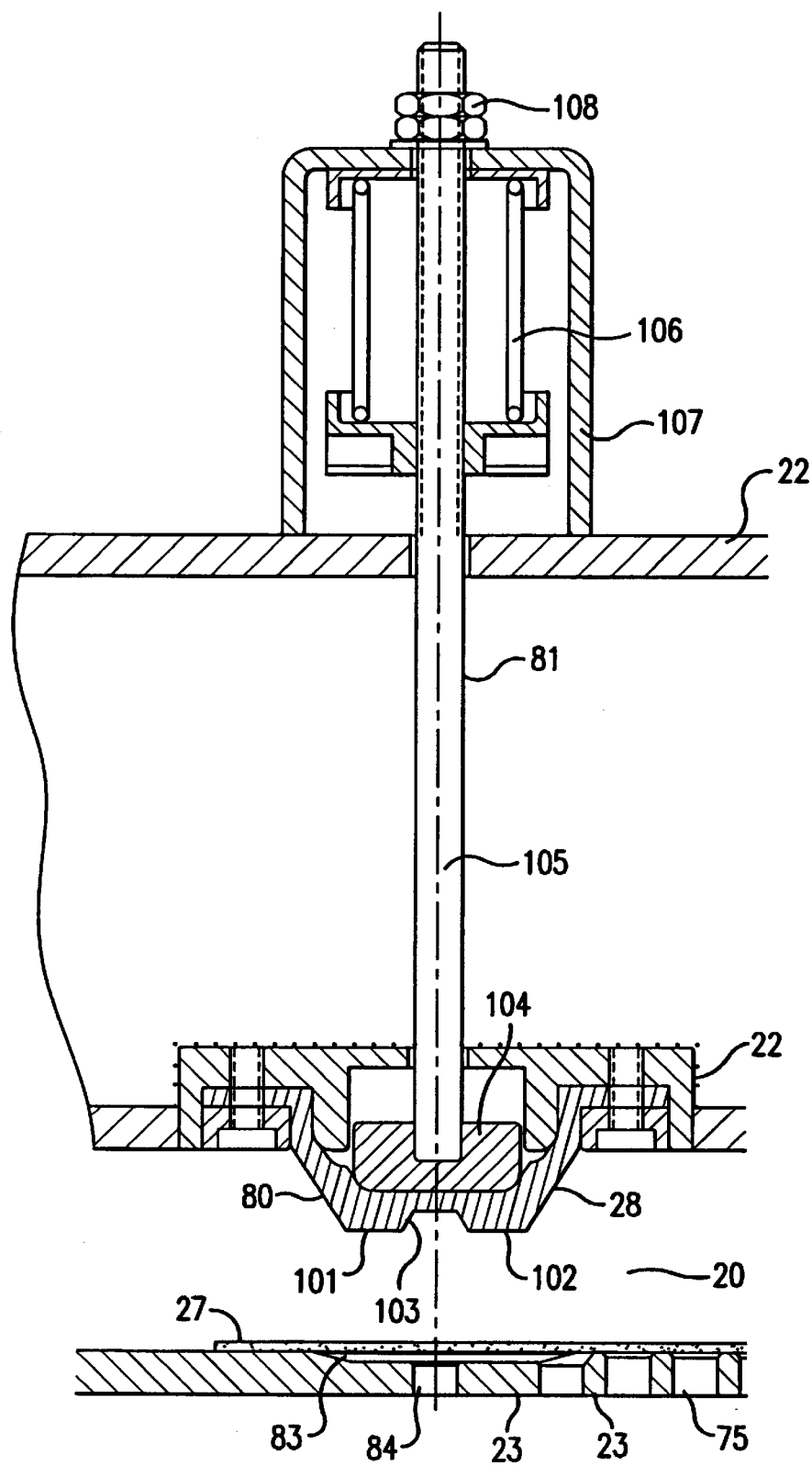
FIG. 9 in an enlarged scale a cross-section of the construction of the seal of the sludge chamber in the opened state.
Figure 10:
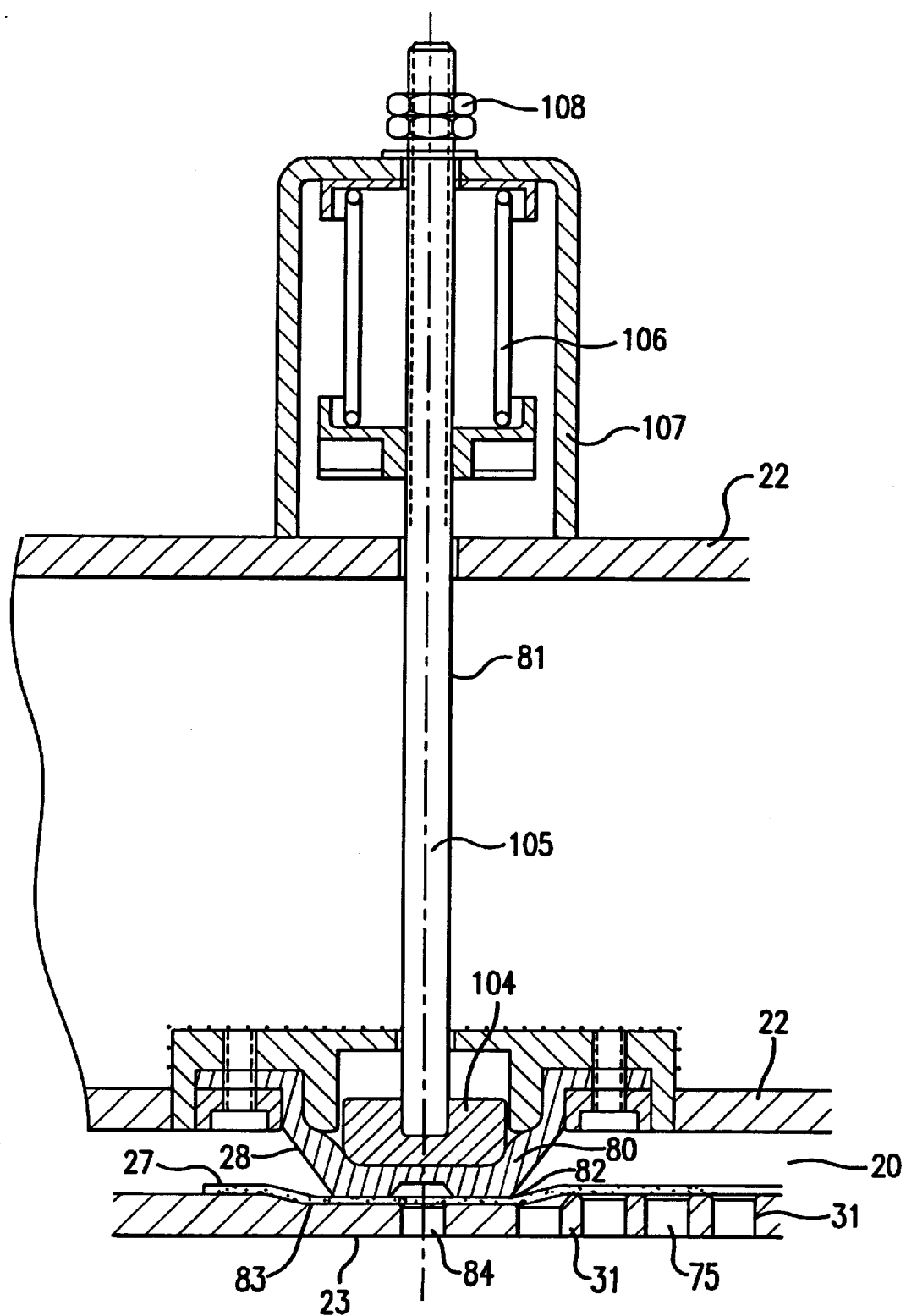
FIG. 10 the seal according to FIG. 9 in the closed state during the creation of the hydrostatic dewatering pressure.
Figure 11:
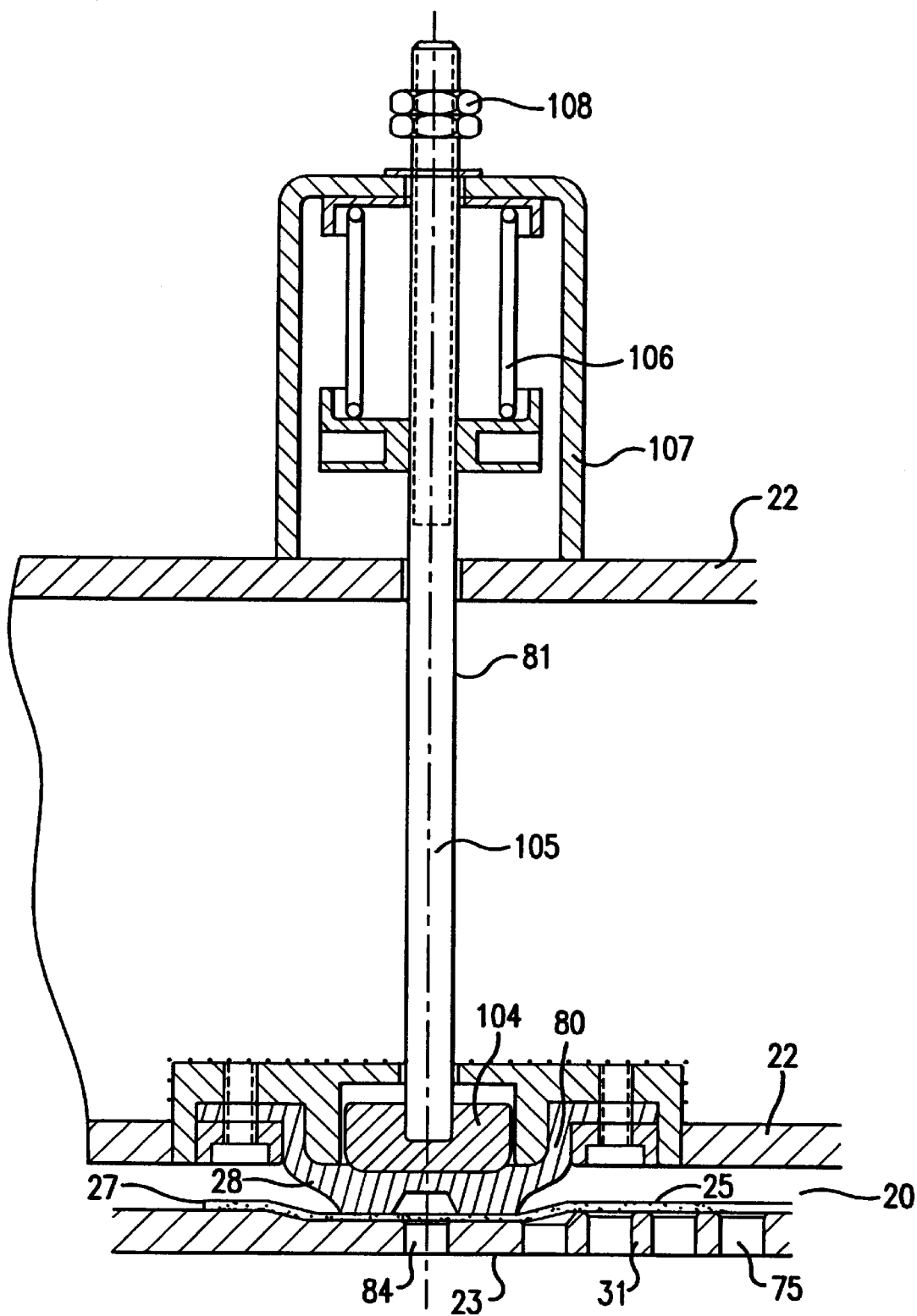
FIG. 11 the seal according to FIG. 9 during the creation of the additional mechanical dewatering pressure.

In the embodiment of the seal 28 as shown in FIGS. 9 to 11, it is preferred to provide an annular flat depression 83 in the bearing plate in the area 82 opposite to the seal 80 which is receiving the sealing lips 101, 102 such that the filter belt 27 is depressed into the recess 83, which is extremely shallow, when the sludge chamber 20 is closed.

Since the embodiment of the seal 28 shown in FIGS. 9 to 11 is having two sealing lips 101, 102 separated by the annular groove 103, it is preferred to provide a number of relieve bores 84 in the area opposite the annular groove 103 within the recess 83. Through these relieve bores 84, the air contained in the annular groove 103 can leave when the pressure state shown in FIG. 11 is achieved in which the additional mechanical dewatering pressure was created in the sludge chamber 20 when the sealing lips 101 and 102 are subjected to a drastic change in shape. Simultaneously, the recess 83, the relieve bores 84 and the sealing lips 101, 102 with the annular groove 103 are forming a relieve labyrinth in which filtrate emanating through the filter belt in a horizontal direction behind the first sealing lip can be relaxed through the relieve bores 84 and can be removed.

Figure 12:
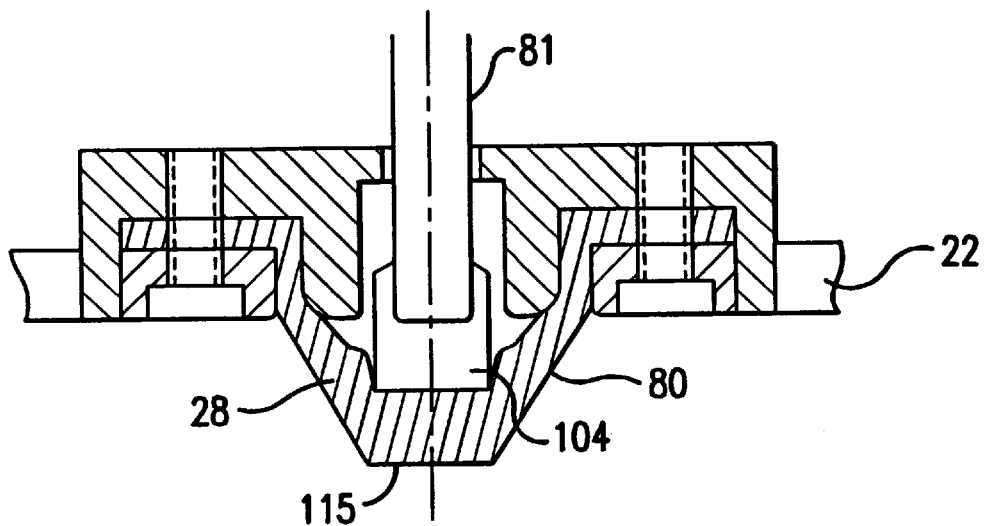
FIG. 12 a schematic cross-section of an alternative embodiment of the seal according FIGS. 9 to 11.
Figure 13:
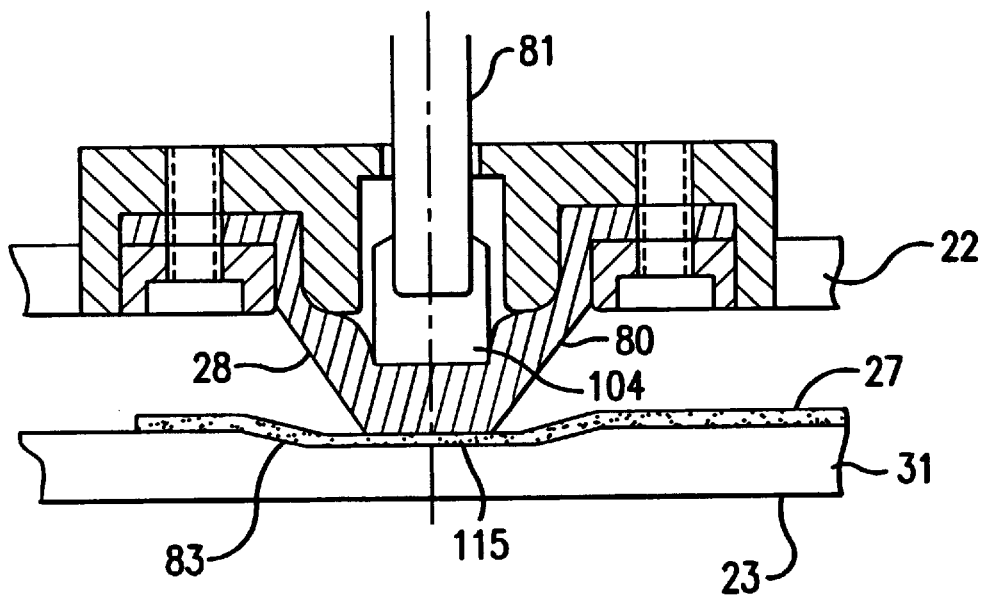
FIG. 13 a view corresponding FIG. 12 of a further embodiment of a seal in the closed state.
Figure 14:
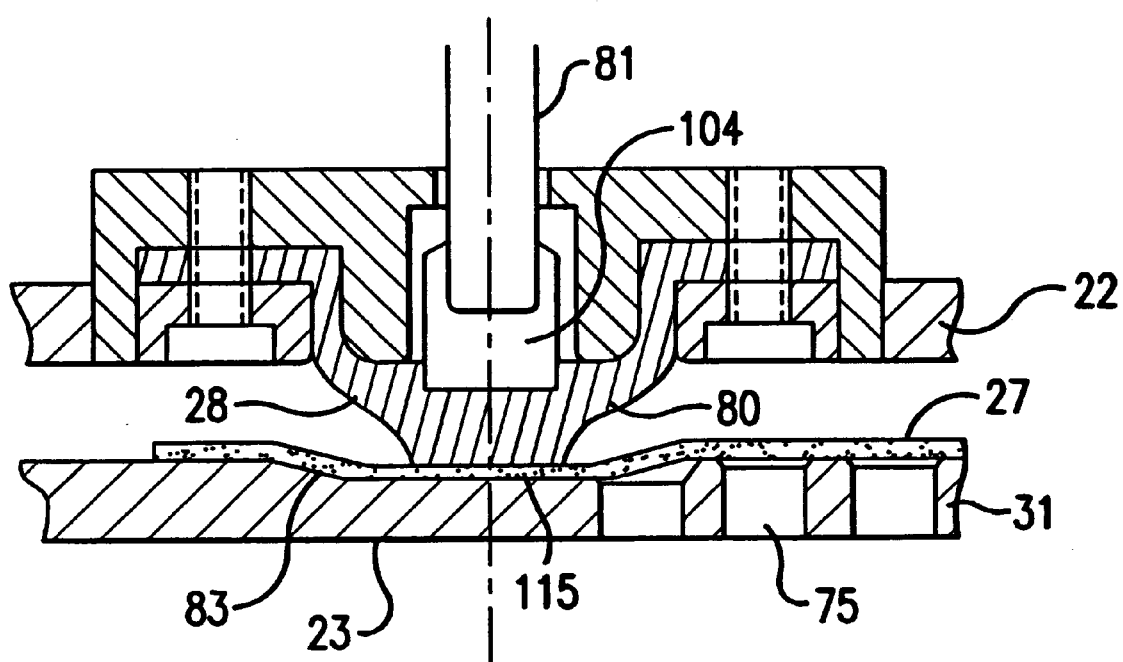
FIG. 14 the seal according to FIG. 13 during the creation of the additional mechanical dewatering pressure.
Figure 15:
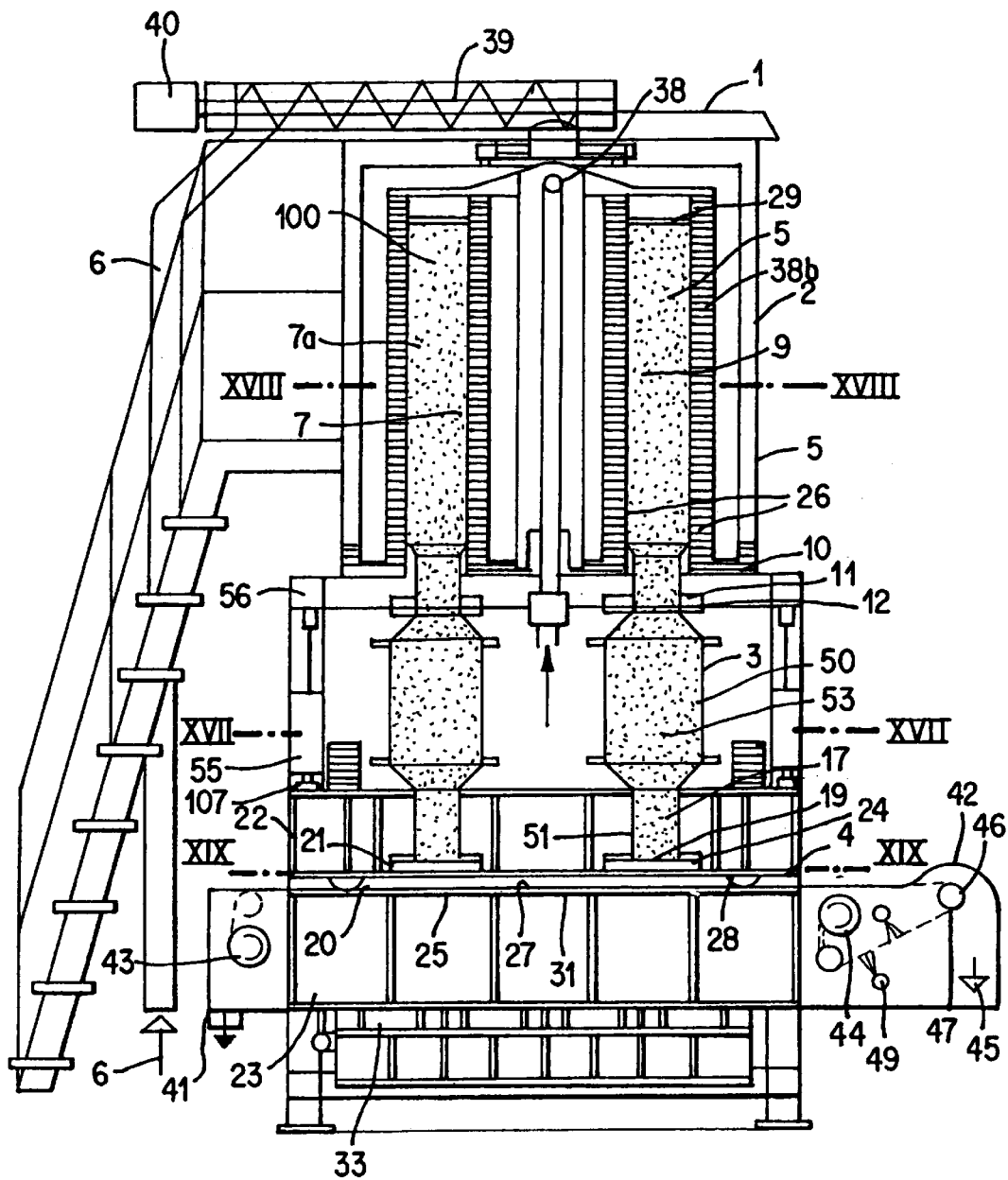
FIG. 15 a cross-sectional view corresponding FIG. 1 of an alternative embodiment of the apparatus according to the invention.
Figure 16:
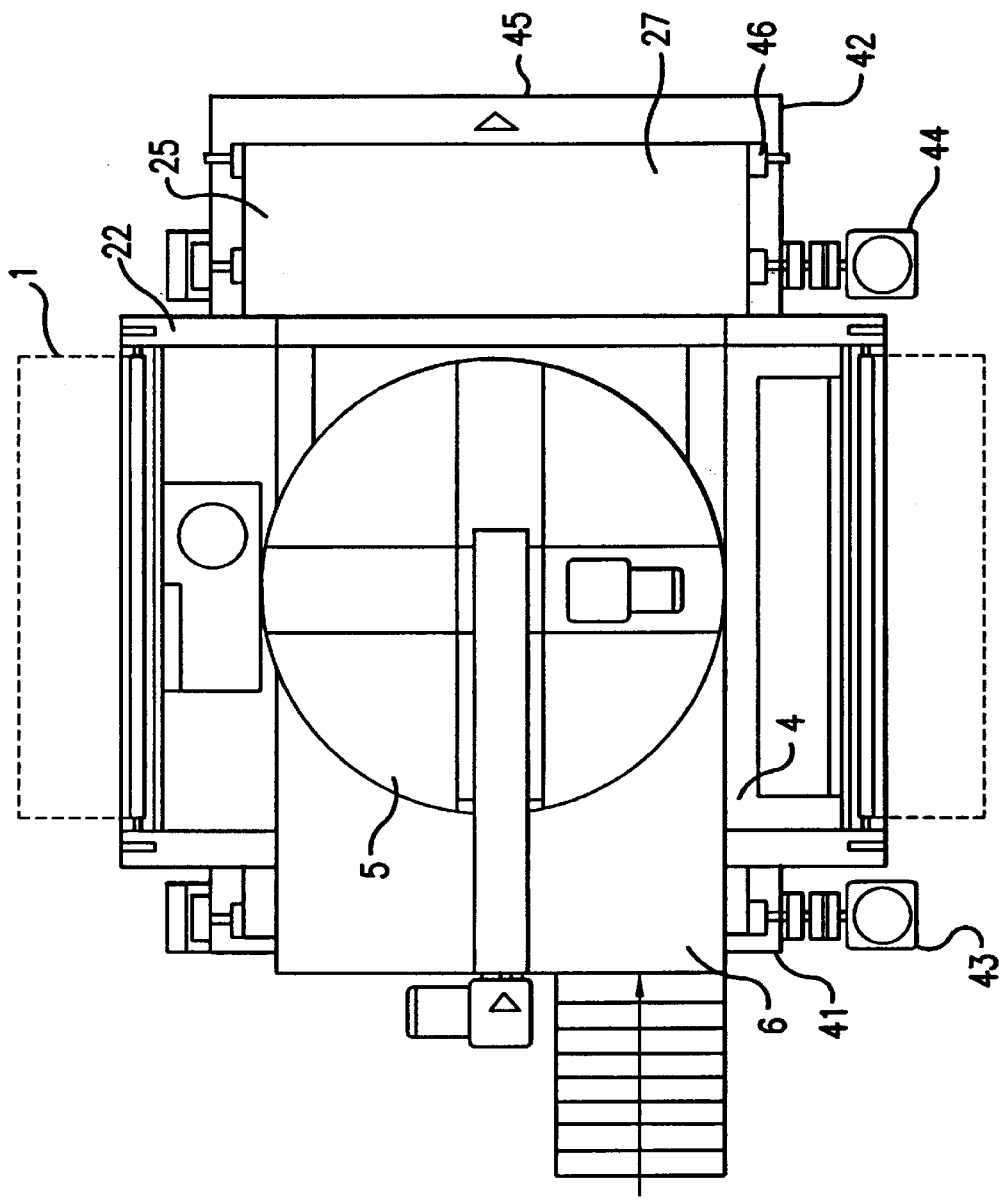
FIG. 16 a top view of the apparatus according to FIG. 15.
Figure 17:
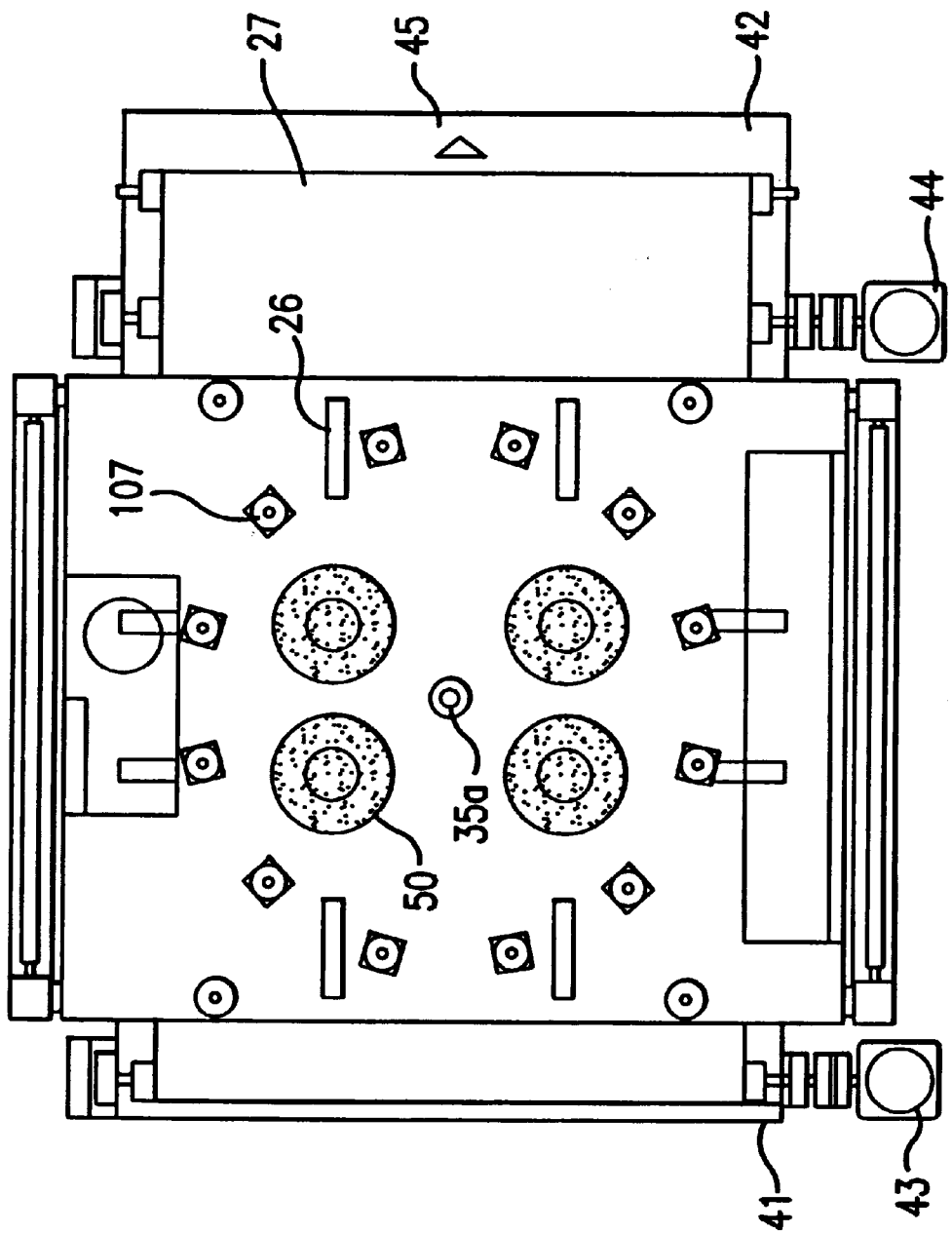
FIG. 17 a cross-section of the apparatus according to FIG. 15 along the line 17—17 in FIG. 15.
Figure 18:
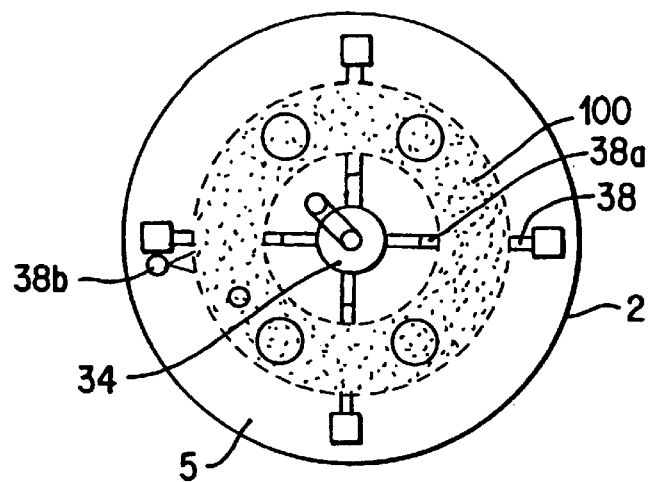
FIG. 18 a cross-sectional view along the line 18—18 in FIG. 15.
Figure 19:
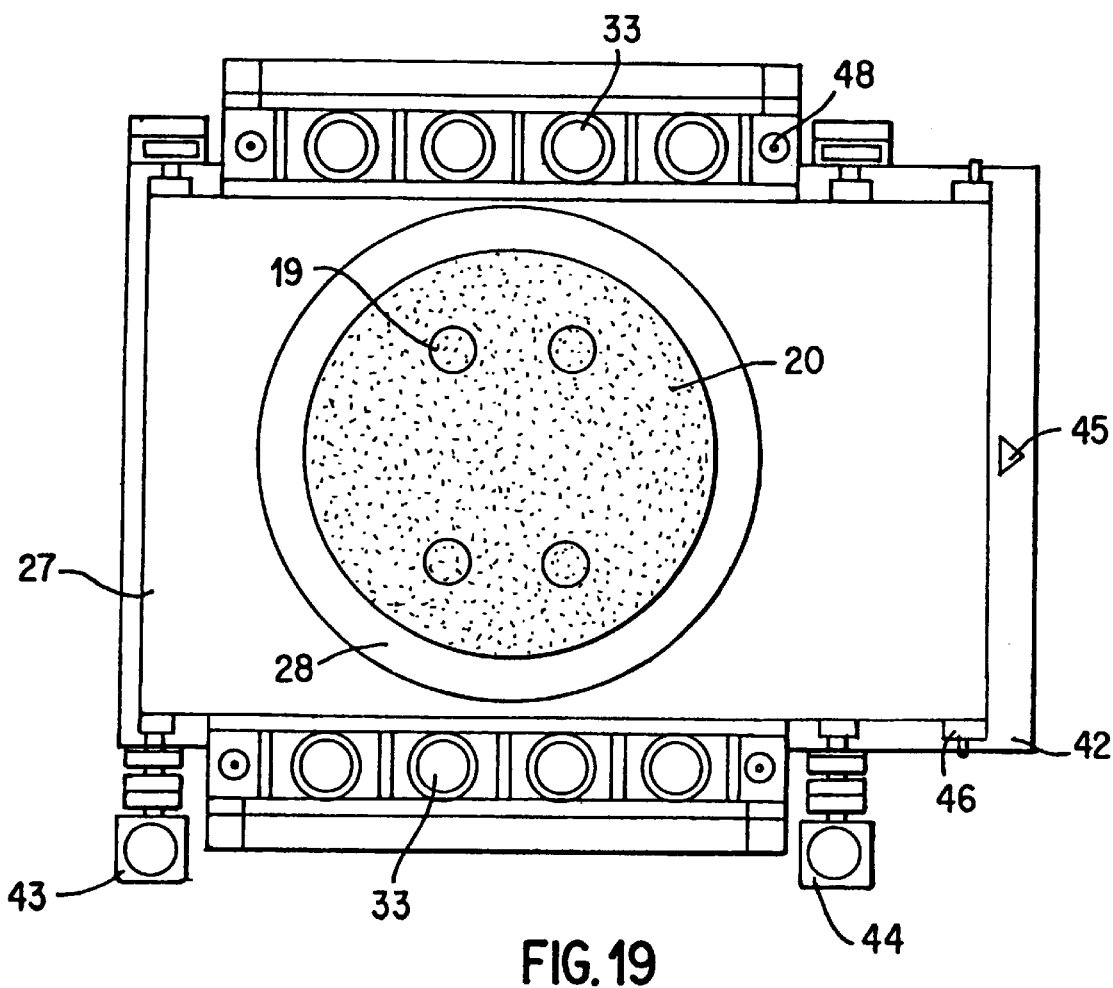
FIG. 19 a cross-sectional view along the line 19—19 in FIG. 15.
Figure 20:
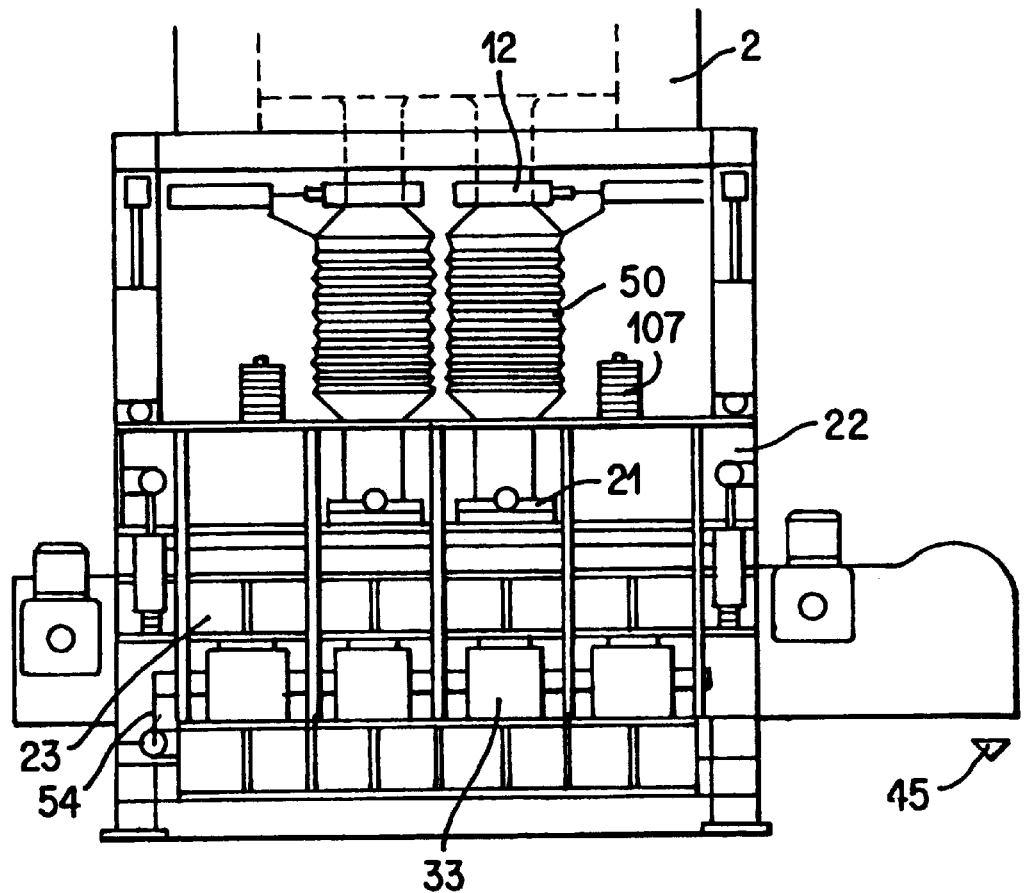
FIG. 20 a side view of a detail of FIG. 15.
Figure 21:
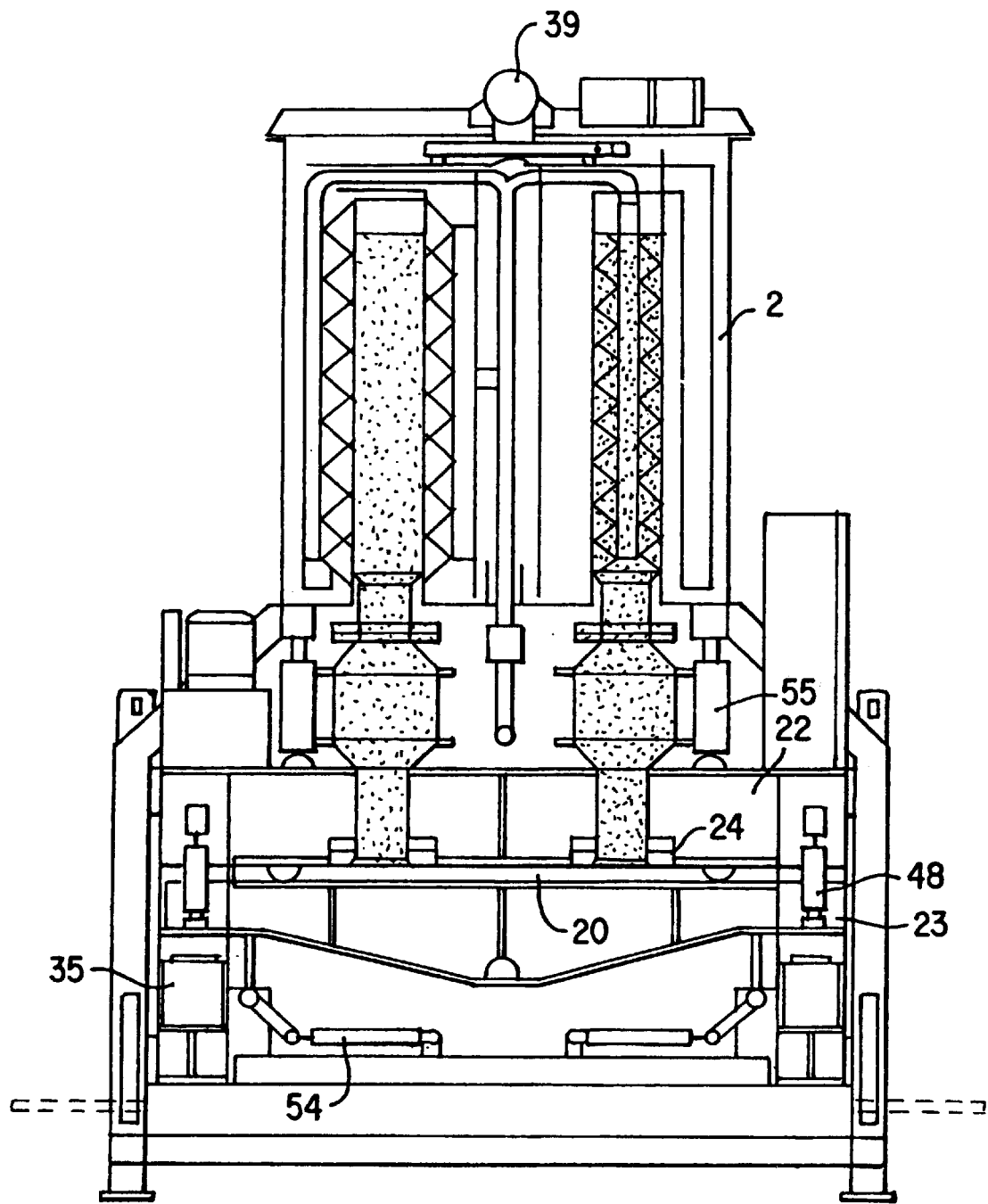
FIG. 21 the apparatus according to FIG. 15 in a view corresponding to FIG. 15 during the creation of the hydrostatic dewatering pressure.

In FIGS. 12 to 14, an alternative embodiment of the seal 28 is shown, wherein the operational states shown are corresponding to the operational states according to FIGS. 9 to 11.

As shown in this case, the seal 28 merely is having one sealing lip 115 which means that the relieve bores 84 in the flat recess 83 are not necessary.

The embodiments of the apparatus 1 according to the invention shown in FIGS. 15 to 35 in different views, details and operational states, in their basic construction correspond to the embodiment according to FIGS. 1 to 14 so that for similar details and parts or functionally similar details and parts, respectively, the same reference numerals had been used in FIGS. 15 to 35. As far as these details are not explained again, it is referred to the above description of the embodiment according to FIGS. 1 to 14.

The embodiment of the apparatus 1 according FIGS. 15 to 35 basically is different from the above described embodiment, in that the sludge without changing the direction from the predewatering stage through the means 3 to create the hydrostatic pressure is fed into the sludge chamber 20 of the filter press 4.

To this end, the means 3 for creating the hydrostatic dewatering pressure is formed as one or more containers 50 being variable in their volume, wherein the flow through the containers 15 is in an axial direction and, wherein the axis of the containers 50 is congruent with the axes of the sludge outlet line 10 of the predewatering stage 2 and the sludge inlet line 51 of the sludge chamber 20.

In the embodiment according to FIGS. 15 to 22, the containers 50 are performed as concertina bellows 53, wherein the concertina bellows 53 are suspended from flat slides 12 on the predewatering stage 2 which are controlling the sludge outlet lines 10 of the predewatering device.

The bottom ends of the concertina bellows 53 forming the containers 50 are containing the sludge feed line 51 of the sludge chamber 20 and are fixed to the upper pressure plate 23. In the embodiment according to FIGS. 15 to 21, the sludge feed lines of the sludge chamber 20, i.e. the sludge inlets 19 of the sludge chamber 20 are controlled by a number of flat slides 24 as in the above described embodiment which are supported in the upper pressure plate 22.

To use the concertina bellows 23 as the means 3 for creating the hydrostatic dewatering pressure, in this embodiment the upper and lower pressure plate 22 and 23, respectively, with the sludge chamber 20 closed in unison are movable upwards and downwards by lifting cylinders 55, wherein the lifting cylinders are extending between the frame 56 of the predewatering stage 2 and the upper pressure plate 22. The detailed operation of the concertina bellows 53 is more detailedly described with reference to FIGS. 26 and 31.

Figure 22:
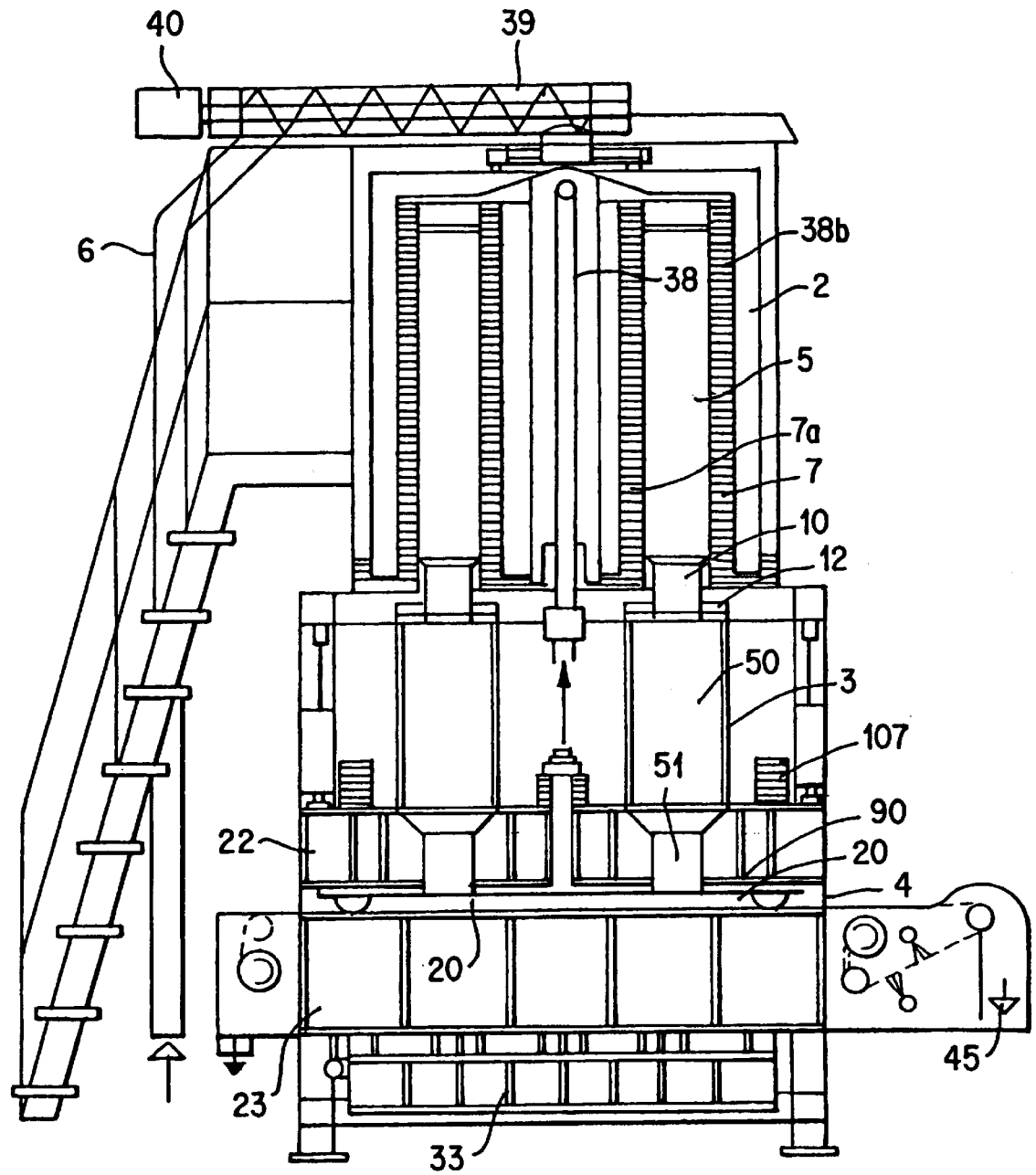
FIG. 22 a side view in cross-section corresponding FIG. 15 of an alternative embodiment in which instead of single slides there is provided a turn-table controlling all sludge inlets of the sludge chamber.

In the embodiment according to FIG. 22 instead of a number of flat slides controlling the sludge inlets 19 of the sludge chamber 20, there is provided a turn-table 90 which simultaneously is controlling all sludge inlets into the sludge chamber 20. Details of this turn-table 30 are more fully described with reference to FIGS. 32 to 35 further below.

Figure 23:
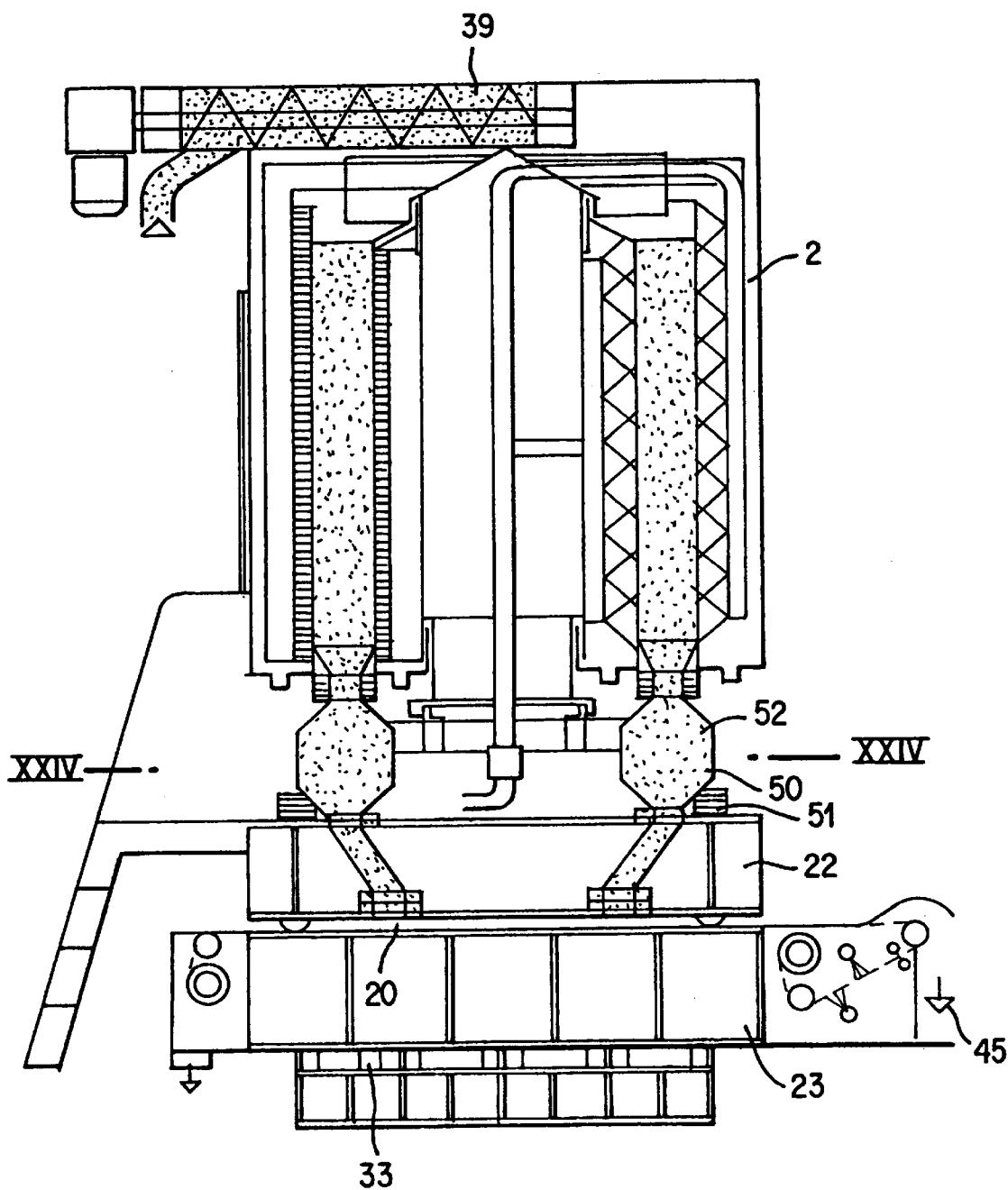
FIG. 23 a side view in cross-section corresponding FIG. 15 of a further alternative embodiment according to the invention, wherein the operational state during the filling of the containers creating the hydrostatic dewatering pressure is shown which in this embodiment are performed in the kind of bellow pumps.
Figure 24:
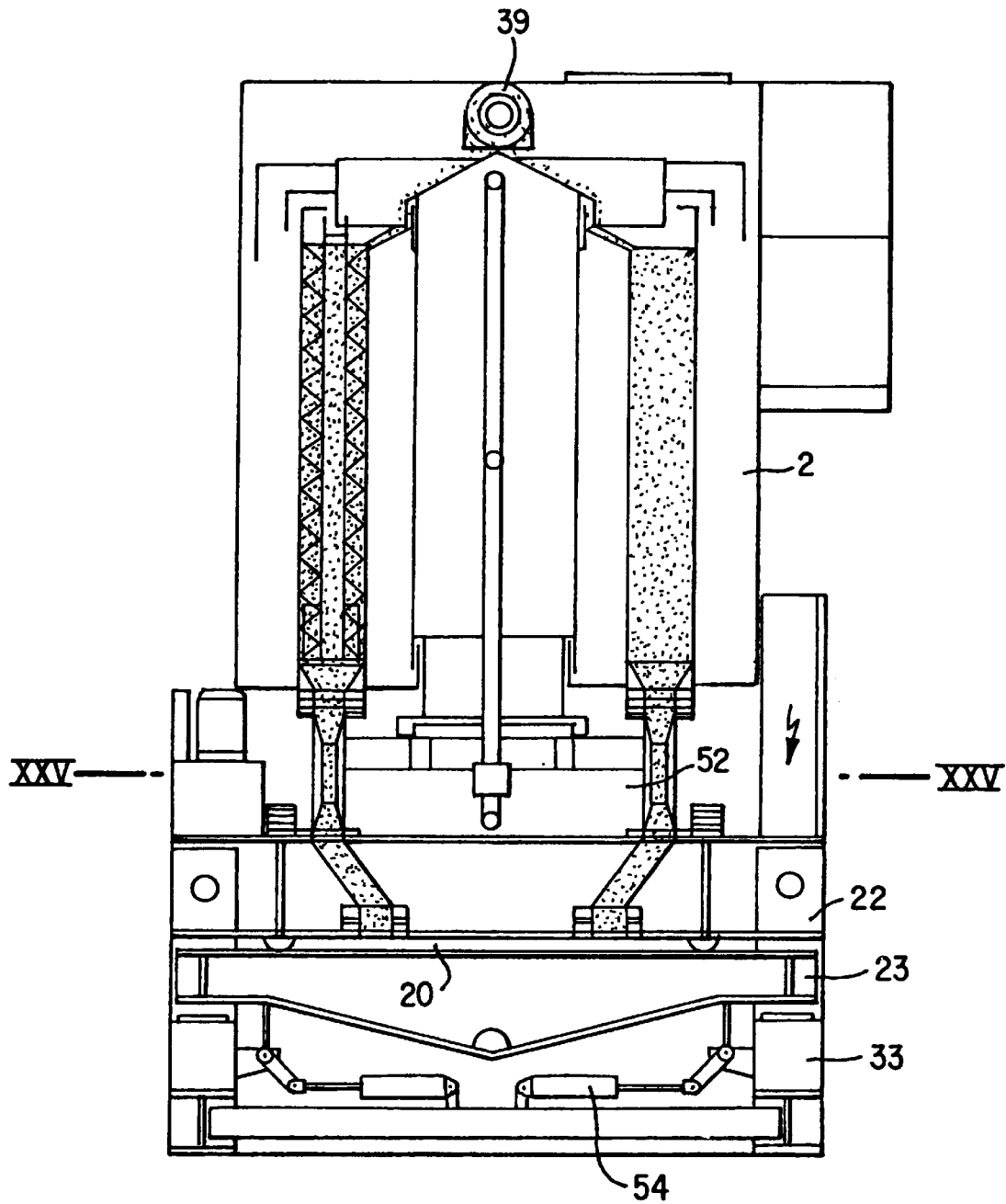
FIG. 24 a view corresponding FIG. 23 of the apparatus according to FIG. 23 during the creation of the hydrostatic dewatering pressure.
Figure 25:
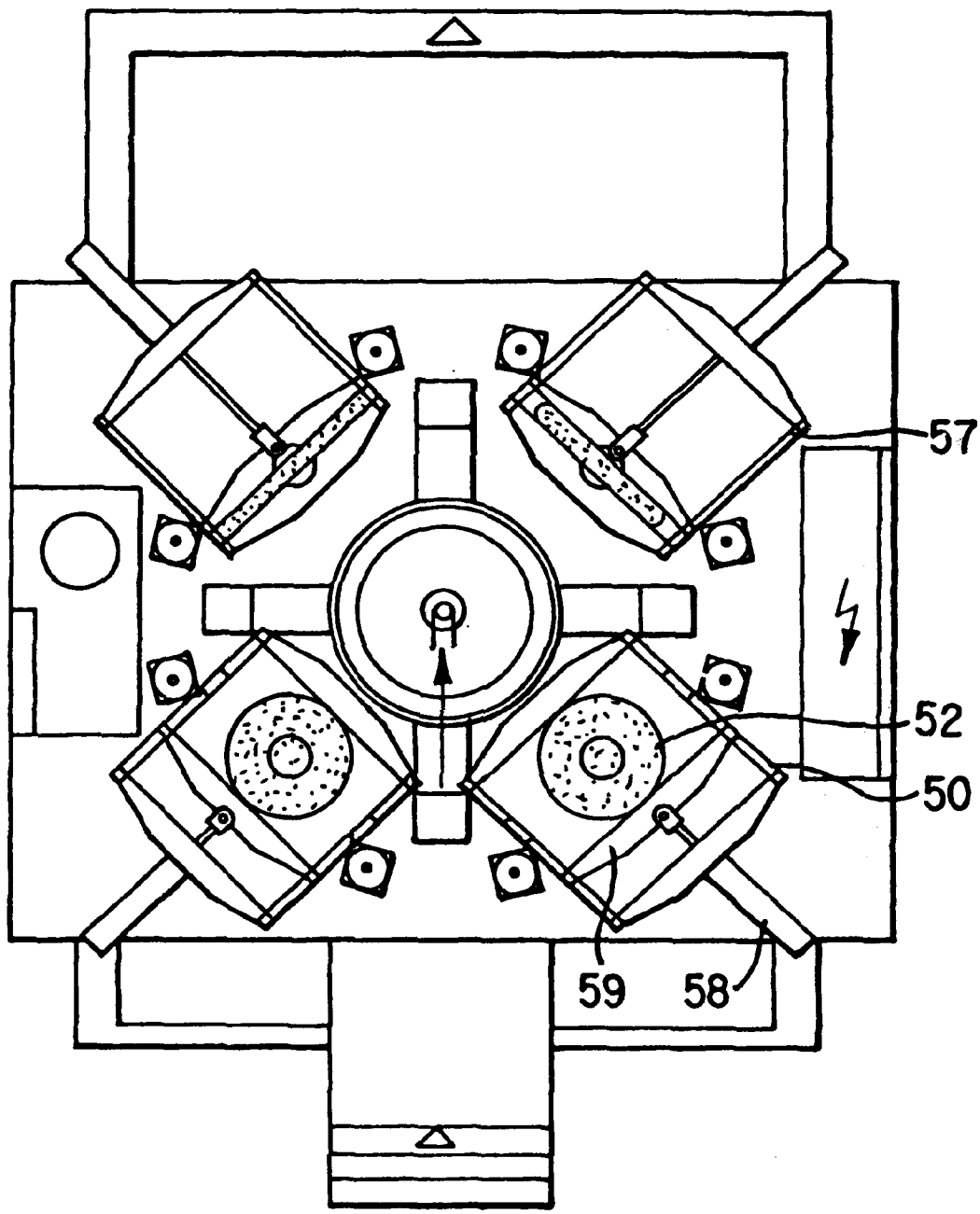
FIG. 25 a cross-sectional view along the line 25—25 in FIG. 23 or FIG. 24, respectively, wherein the two different operational stages of the containers creating the hydrostatic dewatering pressure is shown.

In the embodiment of the apparatus 1 as shown in FIGS. 23 to 25, instead of the concertina bellows 53 as containers 50 there are provided laterally compressible rubber bellows 52 which are performed in the kind of a bellows pump. In this embodiment, too, the sludge without changing its direction is conveyed by the containers 50 for creating the hydrostatic dewatering pressure from the predewatering stage 2 into the sludge chamber 20 of the filter press 4.

As especially shown in FIG. 25, the rubber bellows 52 are positioned in housings 57 and are laterally compressed or expended by plates 59 moved by corresponding drives. In FIG. 25 in the upper part, the compressed rubber bellow 52 are shown, whereas in the bottom half of FIG. 25 the rubber bellows 52 are expanded which evidently is corresponding to two different operational states of the means 3 for creating the hydrostatic dewatering pressure since in the practical operation all rubber bellows 52 always simultaneously are filled or emptied.

For explaining the operation of the embodiment according to FIGS. 15 to 22 of the apparatus 1 according to the invention, now it is referred to FIGS. 25 to 31 in which the apparatus schematically is shown to better explain the operation thereof.

Figure 26:
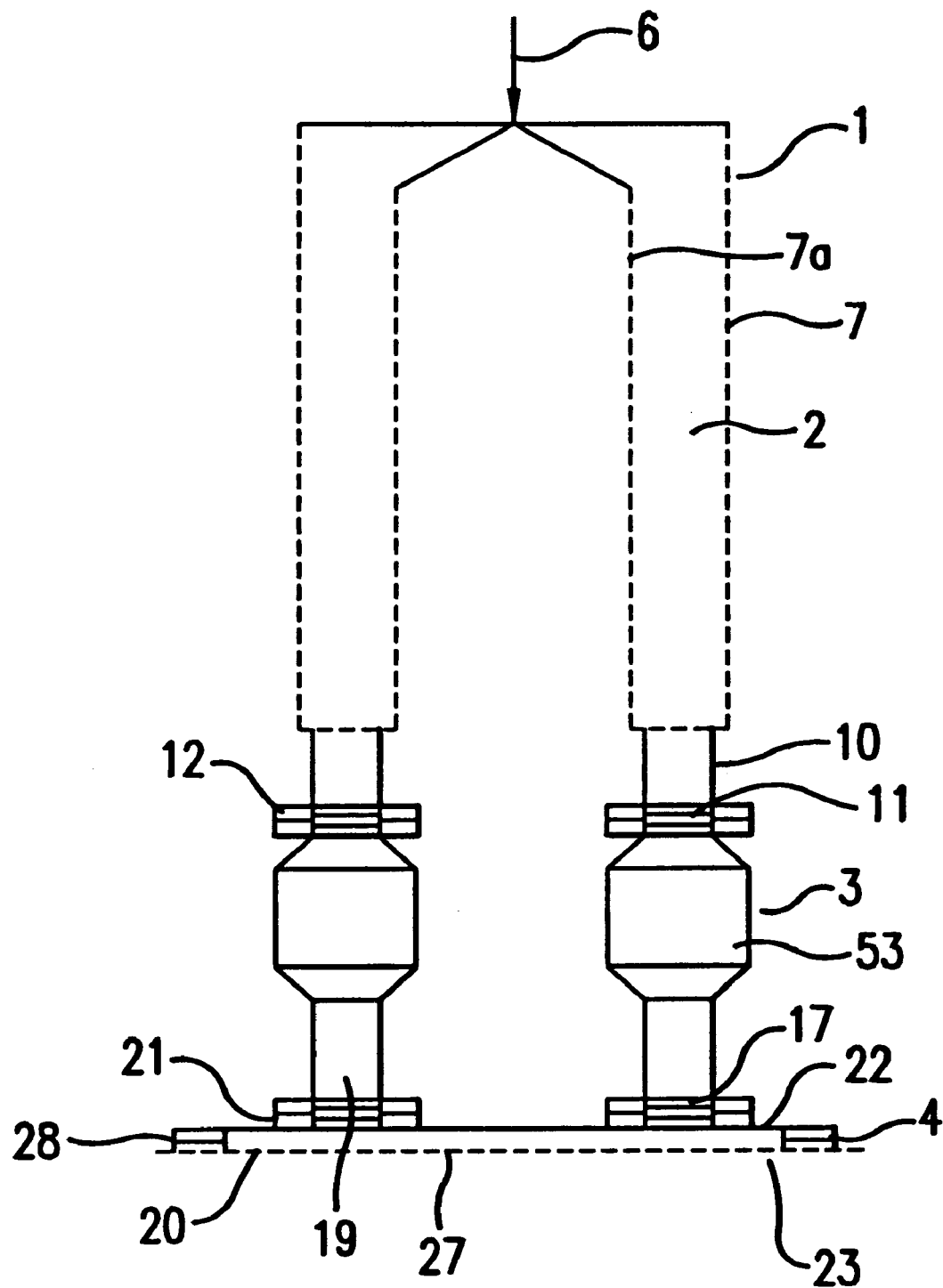
FIGS. 26 to 31 schematic views of the different of operational stages of the apparatus according to FIG. 15.

In the operational state shown in FIG. 26, the state when assuming the work is shown, i.e. the state when the operation is started. In this state, the continuous sludge feed 6 firstly is filling the predewatering stage 2, wherein the flat slides 12 controlling the sludge inlet of the concertina bellows 53 are closed and the flat slides 21 controlling the sludge outlet 17 of the concertina bellows 53 are closed, too, wherein further the sludge chamber 20 positioned between the upper pressure plate 22 and the lower pressure plate 23 is in its lifted position in which the concertina bellows 23 are having their compressed smallest possible volume.

Simultaneously the sludge chamber 20 is closed and is locked by the detent device 54 (not shown in FIGS. 26 to 30).

The filling time and the filling height of the predewatering stage obviously can be adjusted according to the medium to be dewatered, wherein the residence time and the filling height in the predewatering stage 2 is determining the dewatering achieved.

Figure 27:
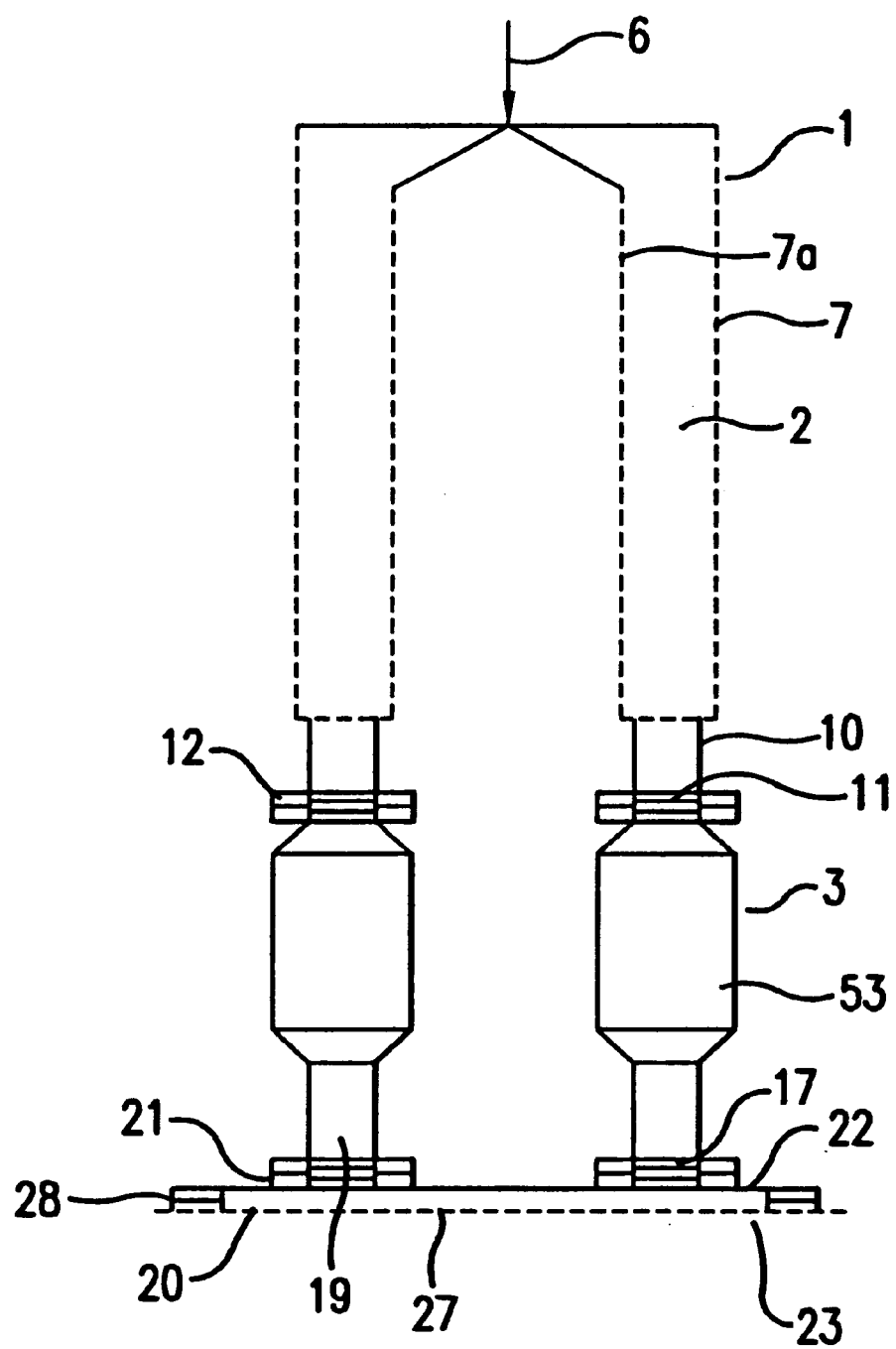

In the operational state shown in FIG. 27, the continuous sludge feed 6 still is filling the predewatering stage 2 which is having the function of a compensation container 5. The flat slides 2 positioned below the sludge outlet lines 10 of the predewatering stage 2 are opened which means that the sludge inlets 11 of the concertina bellows 53 are opened.

Simultaneously the upper pressure plate 22 and the lower pressure plate 23, i.e. the closed sludge chamber 20, are lowered, wherein the flat slides 21 controlling the sludge outlet 17 of the concertina bellows 53 or the sludge inlets 19 of the sludge chamber 20, respectively, are closed. During this working cycle, therefore, the concertina bellows 53 are filled with sludge from the predewatering stage, wherein the filling is such that the sludge without changing its direction directly and vertically downwardly is moved into the concertina bellows 53 from the predewatering stage 2.

Figure 28:
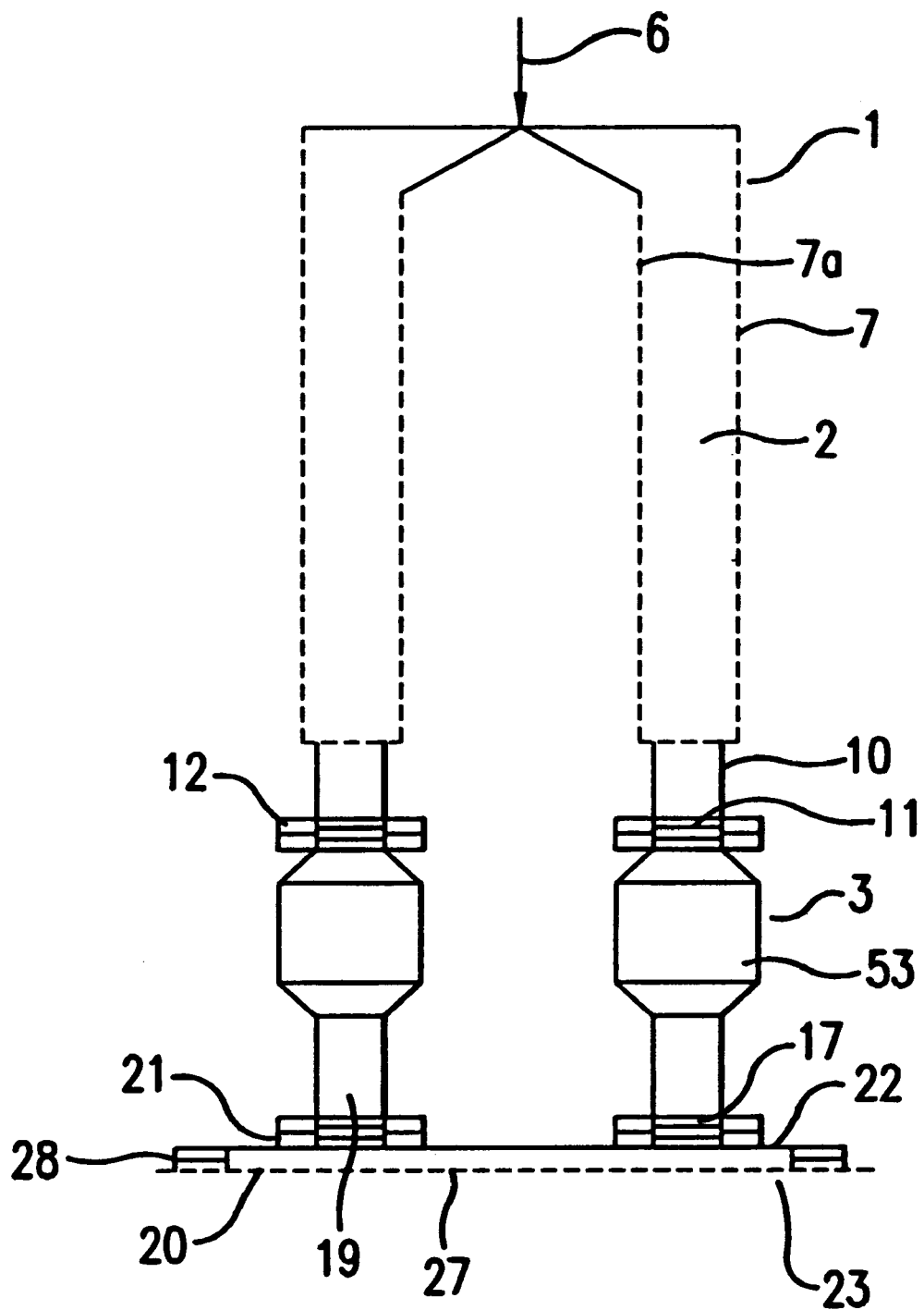

As shown in FIG. 28, thereafter the upper flat slides 12 controlling the sludge inlets 11 of the concertina bellows 53 are closed, wherein the continuous sludge feed 6 further is feeding sludge into the predewatering stage 2. At this time, the lower flat slides 21 controlling the sludge inlets 19 of the sludge chamber 20 are opened and the upper pressure plate 22 and the lower pressure plate 23 are moved upwardly with the sludge chamber 20 which means that the concertina bellows 53 are compressed. During this movement, the sludge chamber 20 is filled with sludge which simultaneously is subjected a hydrostatic dewatering pressure corresponding to the decrease in volume of the concertina bellows 53. The filling time and the filling pressure of the sludge chamber 20 can be adjusted according to the medium to be dewatered.

In the following operational stage shown in FIG. 29, the continuous sludge feed 6 still is running and still is filling the predewatering stage 2.

The upper flat slides 12 controlling the sludge inlet 11 of the concertina bellows 53 are opened, the lower flat slides 21 controlling the sludge inlets 19 of the sludge chamber are closed and the sludge chamber 20 between the upper pressure plate 22 and the lower pressure plate 23 is lowered to its lower dead centre which means that the concertina bellows 53 are expanded and are filled with the next portion of the sludge.

In this operational state, the sludge contained in the sludge chamber 20 is subjected to the increased mechanical dewatering pressure by pressing the lower pressure plate 23 against the upper pressure plate 23 by the high pressure generators (not shown).

Within the sludge chamber 20 during the operation of the high pressure generators, the pressure can be controlled according to the medium to be dewatered, wherein the pressure and the pressing time are determining the dewatering achieved in the high pressure stage.

Figure 30:
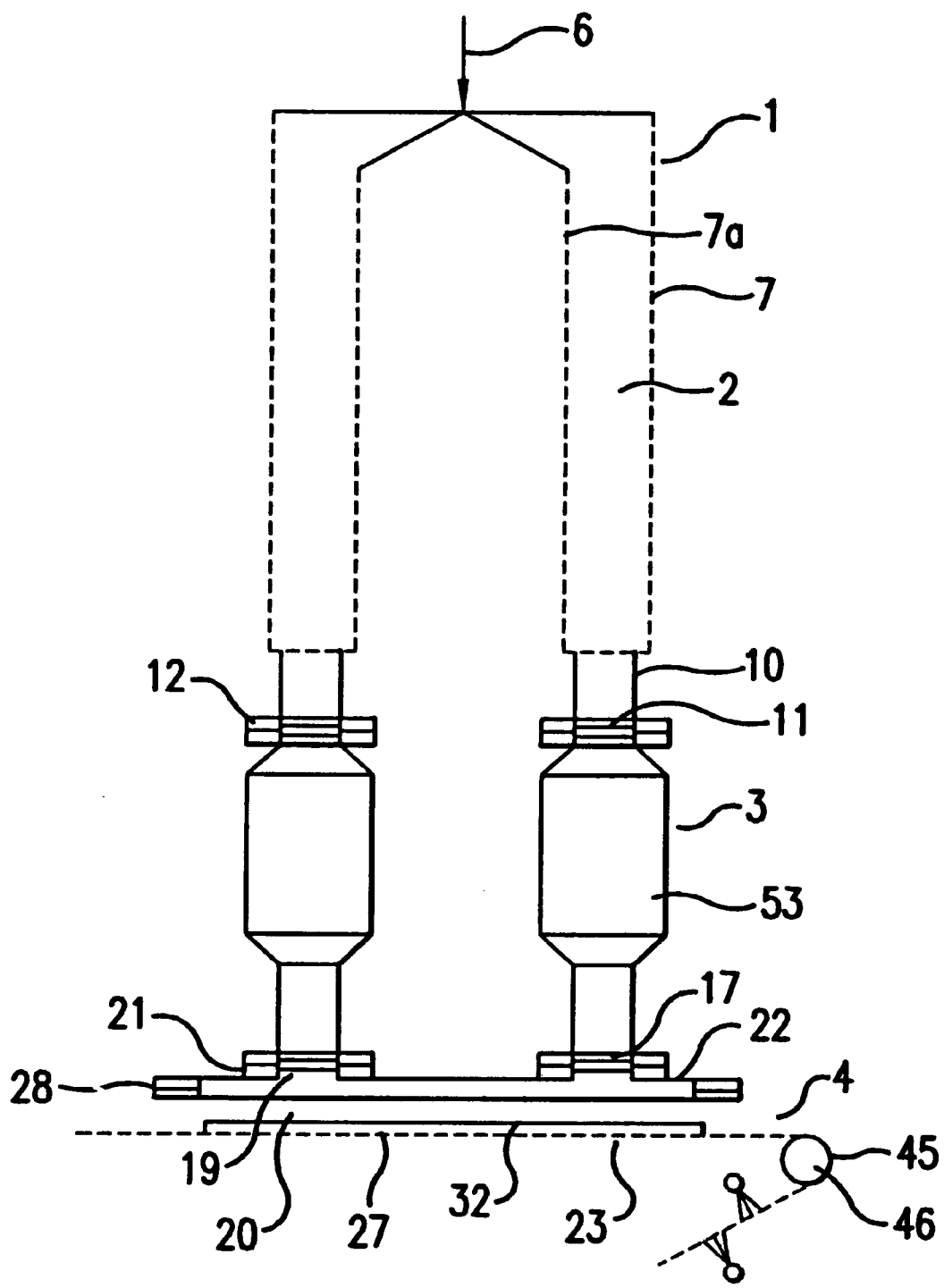

In the operational state shown in FIG. 30, the end of the working cycle of the apparatus according to the invention is shown in that in this state with the continuous sludge feed 6 still running and the concertina bellows 53 completely expended, i.e. the concertina bellows completely filled with sludge, the flat slides 12 controlling the sludge inlets 11 to be concertina bellows 53 are closed and the lower flat slides controlling the sludge inlets 19 to the sludge chamber 20 are closed, too.

The sludge chamber 20 is opened after opening the detent device 54 (not shown) by further lowering the lower pressure plate 23 and the completely dewatered filter cake 32 now by moving the filter belt 27 can be ejected over the exit end 45, wherein the filter belt 27 simultaneously is washed.

After the operational state shown in FIG. 30, the sludge chamber 20 again is closed by lifting the lower pressure plate 23 and locking the detent device 54 and after opening the lower flat slides 27, i.e. opening the sludge inlets 19 of the sludge chamber 20, it is returned into the operational state shown in FIG. 28.

Figure 29:
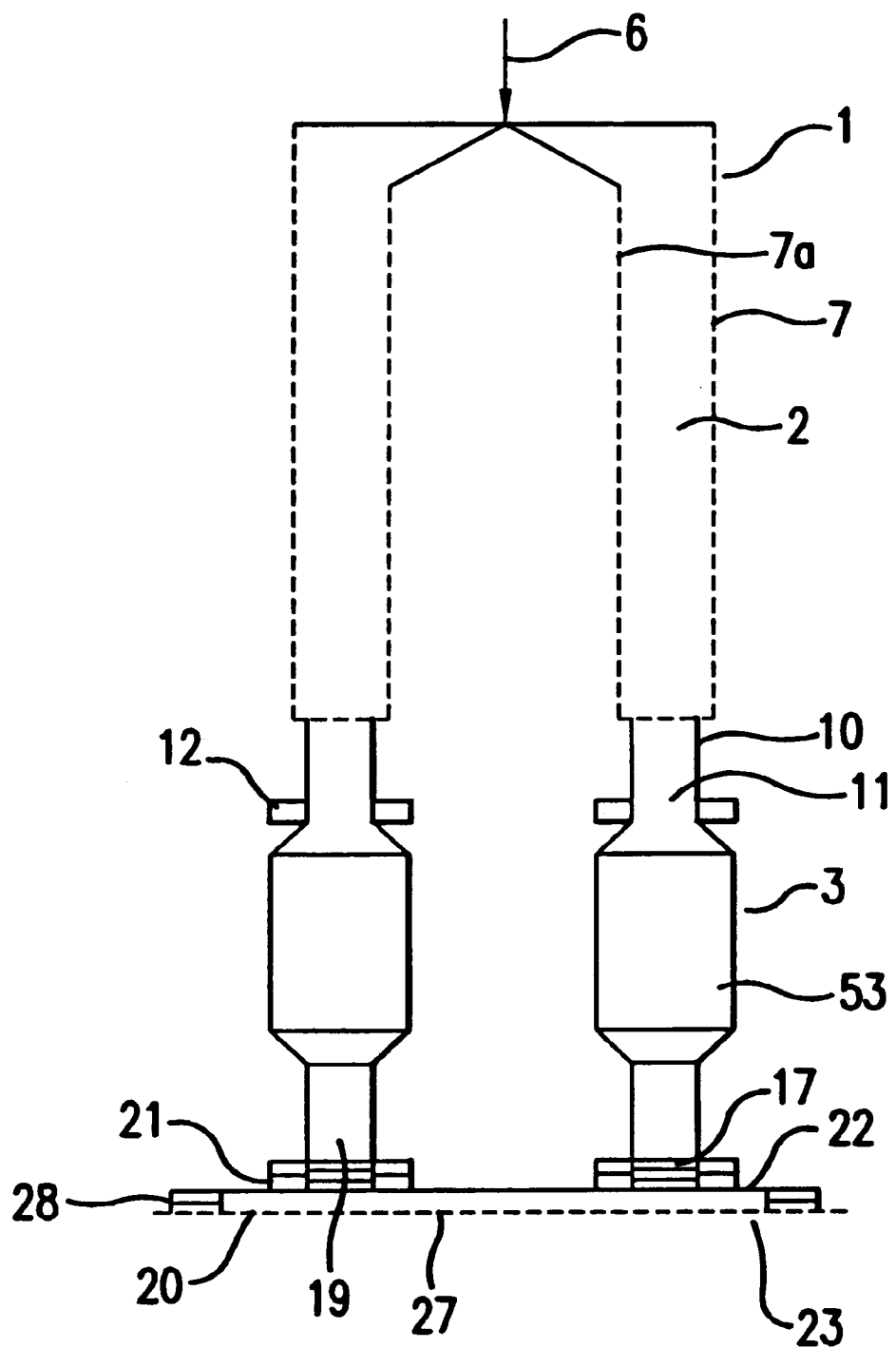

The cycle time of the operational states shown in FIGS. 28 to 30 is determined by the cycle of the high pressure stage, i.e. of the filter press 4, and can be controlled in accordance with the medium to be dewatered, wherein the inactive switching time of the sludge chamber 20 in the filter press 4 each only is amounting to one minute. This one minute is necessary to perform the work shown in FIG. 30, namely, to open the sludge chamber 20, to remove the filter cake 32 by means of the filter felt 27 to simultaneously wash the filter belt 27 and to close the sludge chamber 20 again.

Figure 31:
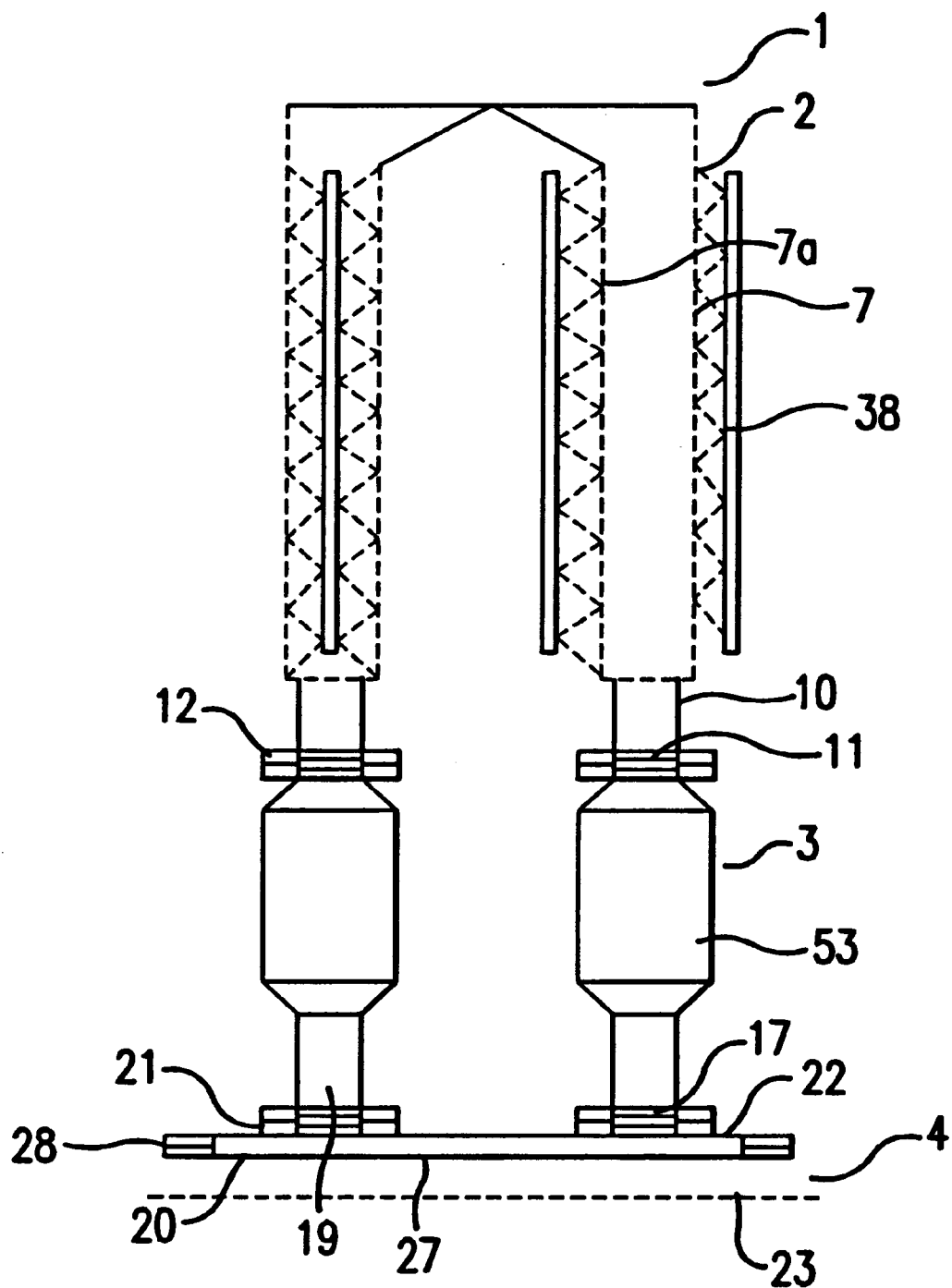

For the sake of completeness in FIG. 31 an operational state is shown which is corresponding to the end of a working day, wherein the continuous sludge feed 6 has been switched off and the entire apparatus 1 is cleaned. To this end, the predewatering stage 2 is emptied by the preceding cycles and the concertina bellows 53 are emptied, too. After the last filter cake has been removed from the sludge chamber 20, the upper and the lower flat slides 12 and 21, respectively, are opened and the filter baskets 7, 7a of the predewatering stage 2 are cleaned by the cleaning means 38, wherein simultaneously the remainder of the apparatus 1 is cleaned, too.

From the above description, it is obvious that in this embodiment according to the invention, i.e. in an embodiment with containers 50 being changeable in volume, the sludge to be dewatered does not change direction after having left the mixer 39 until reaching the sludge chamber 20 and filling the same. By this, an extremely delicate treatment of the flocculated sludge is ensured.

In FIGS. 32 to 35, there are shown details of the turn-table 90 which in the embodiment according to FIG. 22 instead of the flat slides 21 controlling the sludge inlets 19 of the sludge chamber 20 is simultaneously controlling all sludge inlets 19 of the sludge chamber 20.

The turn-table 90 within the sludge chamber 20 is supported on the upper pressure plate 22 and by springs 91 is pretensioned in an upward direction against the pressure plate 22, wherein in the pressure plate 22 there is provided a seal 29 contacting the turn-table 90. The turn-table 90 is having a number of inlet openings 93 the number and position of which is corresponding to the number and position of the sludge inlets 19 into the sludge chamber 20.

The turn-table 90 is fixed to a shaft 94 which is extending upwardly through the upper pressure plate 92 into a bearing 95. By a drive 96, the shaft 94 can be reciprocated in an angle of about maximal 45°, wherein the inlet openings 93 either are aligned with the sludge inlets 19 or are closing the same.

Figure 32:
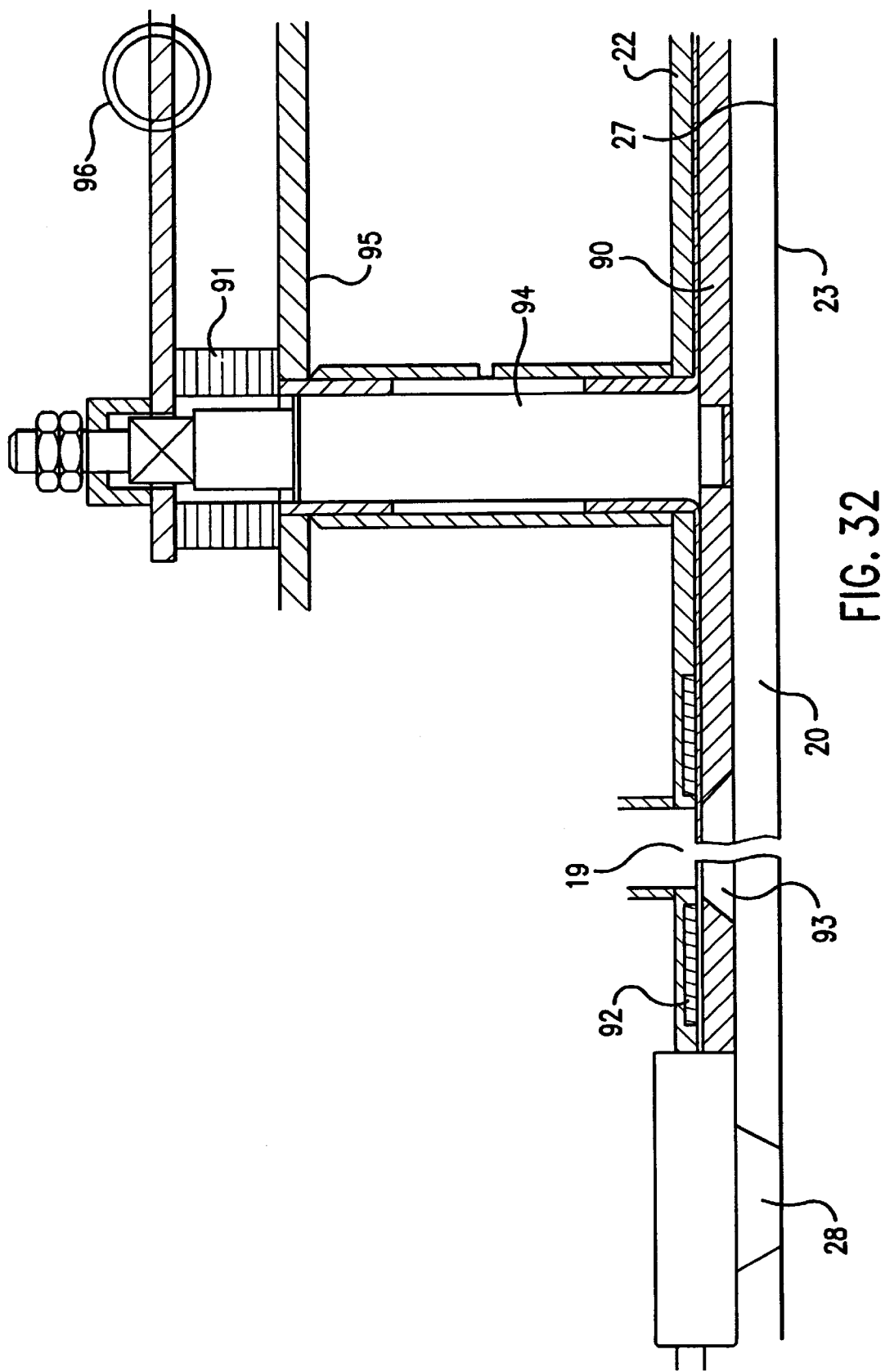
FIG. 32 a cross-sectional view of the turn-table in an enlarged scale which is provided instead of flat slides in the embodiment according to FIG. 22.
Figure 33:
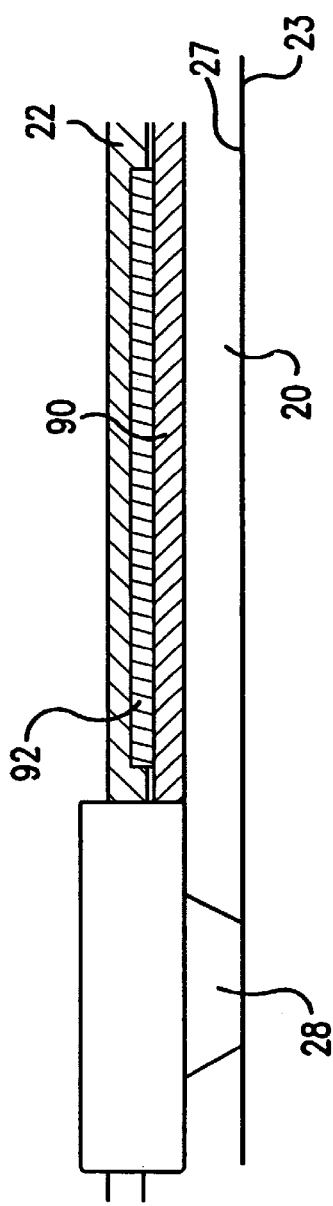
FIGS. 33 to 35 the different positions of the turn-table according to FIG. 32 corresponding the operational stages of the apparatus according to the invention.
Figure 34:
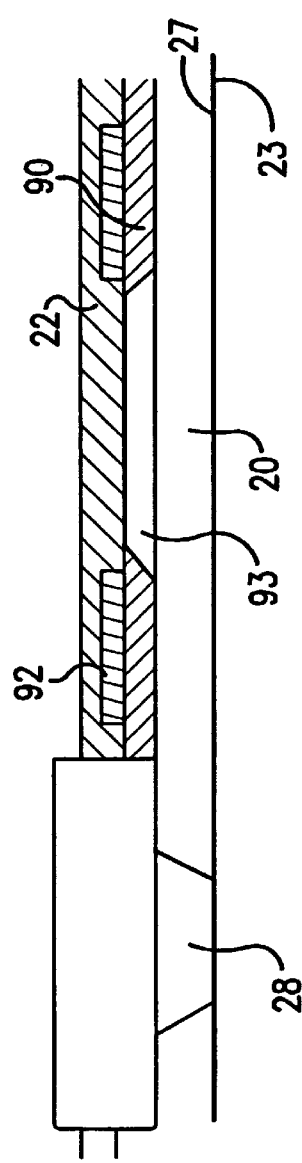
Figure 35:
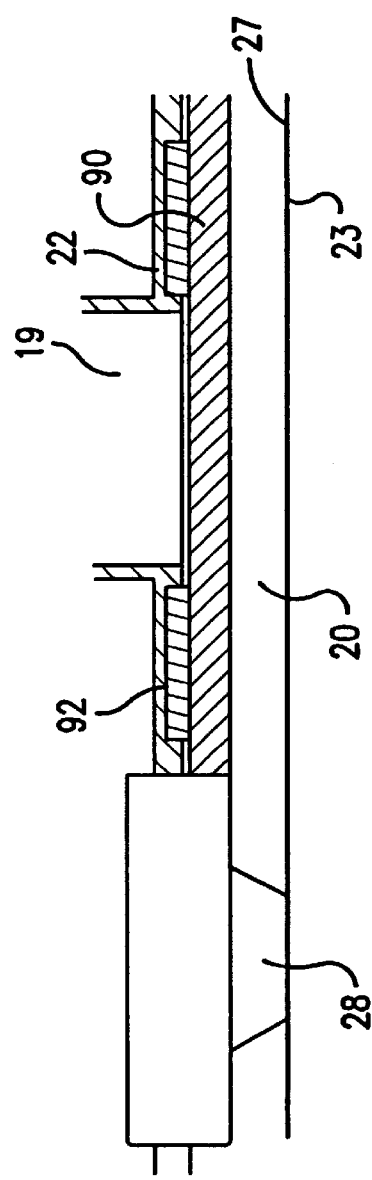

In FIGS. 33 to 35, the different positions of the turn-table 90 are shown which can be adopted in addition to the position shown in FIG. 32, wherein in FIG. 32 the state is shown in which the sludge inlets 19 of the sludge chamber 20 are opened to fill the sludge chamber and to subject the sludge chamber to a hydrostatic pressure of up to about 3 bar.

In FIGS. 33 and 34, there are shown positions of the turn-table 90 in which the feed openings, i.e. the sludge inlets 19 of the sludge chamber 20 are shown, and in which in the sludge chamber the high pressure dewatering up to about 20 bar is performed by the mechanical dewatering pressure.

In the position of the turn-table 90 shown in FIG. 35, all sludge inlets 19 are closed, too, while for example the concertina bellows 53 are filled from the predewatering stage 2.

By this kind of construction, the constructive expenditure extremely is decreased by using a single control device instead of a plurality of flat slides.

All features and advantages of the invention which can be learnt from the specification, the claims and the drawings, including constructive details could be important for the invention singularly or in any possible combination.

What is claimed:

1. Apparatus for dewatering of sludge and similar substances comprising:
    pressure plates forming a sludge chamber provided with filter areas and having at least one sludge inlet,
    means connected to said at least one sludge inlet and creating a hydrostatic filtration pressure,
    high pressure generators by which at least one of the pressure plates is movable to decrease the volume of the sludge chamber after achieving a hydrostatic dewatering pressure to create an additional mechanical dewatering pressure,
    a predewatering stage containing filter areas forming a compensation container, and
    a continuous sludge feed to which the predewatering stage is connected, the predewatering stage additionally being connected to the means connected to said at least one sludge inlet and creating the hydrostatic filtration pressure,
    wherein the filter areas of the sludge chamber, for removing filter cake after opening the pressure plates, are movable with respect to the sludge chamber,
    wherein the means connected to said at least one sludge inlet and creating the hydrostatic filtration pressure is at least one container which is variable in volume,
    wherein the sludge passes axially through the at least one container, and
    wherein an axis of the at least one container is congruent with axes of a sludge discharge line of the predewatering stage and of a sludge feed-line of the sludge chamber.

2. Apparatus according to claim 1, wherein the at least one container is a concertina bellows having a length which is axially changeable.

3. Apparatus according to claim 2, wherein the concertina bellows are suspended from the predewatering stage and, for creating the hydrostatic filtration pressure, upper and lower pressure plates can be lifted in unison with said sludge chamber closed to compress the concertina bellows.

4. Apparatus according to claim 1, wherein the sludge chamber has a plurality of sludge inlets and a corresponding number of containers, each of the containers having a sludge exit connected, by a separate connection, with one of the sludge inlets of the sludge chamber.

5. Apparatus according to claim 1, and further comprising at least one turn-table forming closing and control valves to simultaneously close sludge inlets and sludge outlets, the at least one turn-table being directly assigned to the sludge outlets, positioned at sludge inlets of the sludge chamber, and pretensioned by springs against a seal.

6. Apparatus according to claim 1, wherein the filter areas of the predewatering stage are about 90% and the filter areas of the sludge chamber are about 10% of an overall filter area of the apparatus, wherein the sludge chamber has a circular contour, and wherein the filter areas of the sludge chamber are formed by a filter belt which is rectilinearly reciprocable on a movable lower pressure plate.

7. Apparatus according to claim 1, wherein the sludge chamber is surrounded by an annular flexible seal fixed on an upper pressure plate and further comprising push-rods supported in the upper pressure plate by which the seal is pretensioned in the direction of the lower pressure plate.

8. Apparatus according to claim 1, and further comprising a bearing plate which supports the filter areas within the sludge chamber, the bearing plate being provided with channels which open in the direction of the filter areas and which form bores.

9. Apparatus according to claim 8, wherein the bearing plate is provided with an annular shallow recess opposite the seal and wherein relieve bores are provided in said annular shallow recess.

10. Apparatus according to claim 1, wherein the high pressure generators are positioned laterally outside the area of the sludge chamber and are hydraulic single action cylinders.

11. Apparatus according to claim 1, and further comprising a detent apparatus acting on a lower movable pressure plate to mechanically lock the sludge chamber in a closed position.

12. Apparatus according to claim 1, wherein the predewatering stage has a circular cross-section, wherein the predewatering device has two concentric filter baskets with a gap between said filter baskets which is connected with the continuous sludge feed, wherein the sludge outlets are positioned in a bottom of the gap between said filter baskets, and wherein the sludge inlets are positioned directly below the sludge outlets.

13. Apparatus according to claim 12, and further comprising rotatably driven brushes extending over an entire height of the filter baskets on filtrate sides of the filter baskets.

* * * * *